(12) United States Patent
Kaltenbach et al.

(10) Patent No.: US 12,510,136 B1
(45) Date of Patent: Dec. 30, 2025

(54) DRIVE UNIT FOR A VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Alexander Thorwart, Langenargen (DE); Michael Preuß, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/069,359

(22) Filed: Mar. 4, 2025

(30) Foreign Application Priority Data

Mar. 5, 2024 (DE) ...................... 10 2024 202 039.7

(51) Int. Cl.
| | |
|---|---|
| *B60K 17/12* | (2006.01) |
| *B60K 17/16* | (2006.01) |
| *B60K 17/22* | (2006.01) |
| *F16H 3/72* | (2006.01) |
| *F16H 61/04* | (2006.01) |
| *B60K 1/02* | (2006.01) |

(52) U.S. Cl.
CPC ............. *F16H 3/728* (2013.01); *B60K 17/12* (2013.01); *B60K 17/16* (2013.01); *B60K 17/22* (2013.01); *F16H 61/0403* (2013.01); *B60K 1/02* (2013.01); *F16H 2061/0422* (2013.01); *F16H 2200/2094* (2013.01)

(58) Field of Classification Search
CPC ... B60K 1/02; B60K 17/12; F16H 2200/2094; F16H 2200/0021
See application file for complete search history.

(56) References Cited

U.S. PATENT DOCUMENTS

| | | | |
|---|---|---|---|
| 9,399,394 B2 | 7/2016 | Kaltenbach et al. | |
| 10,919,385 B2 * | 2/2021 | Kumar | B60K 1/02 |

(Continued)

FOREIGN PATENT DOCUMENTS

| | | | | |
|---|---|---|---|---|
| CN | 113978224 A | * | 1/2022 | B60K 1/02 |
| CN | 116480739 A | * | 7/2023 | F16H 3/44 |

(Continued)

OTHER PUBLICATIONS

German Patent Office, German Search Report issued in German Patent application No. 10 2024 202 039.7(Dec. 11, 2024).

*Primary Examiner* — Sherry L Estremsky
(74) *Attorney, Agent, or Firm* — Finch & Maloney PLLC

(57) ABSTRACT

A drive unit has first and second electrical machines arranged axially parallel, a manual gearbox arranged axially parallel to the electrical machines, a differential, a drive shaft, an output shaft, and a positive-locking shift unit having a first shift element, a second shift element, and a sliding sleeve displaceable via a first actuator into one of three shift positions. In a first shift position, the first shift element is closed and the second electrical machine is connected to the drive shaft with an actuating effect; in a second shift position, both shift elements are open and the second electrical machine is decoupled from the gearbox; in a third shift position, the second shift element is closed and the second electrical machine is connected to the output shaft with an actuating effect. The drive shaft is hollow, and the output shaft is arranged within the drive shaft.

15 Claims, 11 Drawing Sheets

(56) References Cited

U.S. PATENT DOCUMENTS 11,958,348 B2 * 4/2024 Raeder .................. B60K 17/16
2023/0311629 A1 * 10/2023 Raeder .................. B60K 17/16
180/65.6

FOREIGN PATENT DOCUMENTS

CN         220009415 U        11/2023
DE     10 2013 214 238         1/2015
DE        102019206963 A1 *   11/2020   ........... B60K 17/046

* cited by examiner

| Zustand | Gang EM1 | Gang EM2 | B | C | D | E |
|---|---|---|---|---|---|---|
| 1 | E2 | E2 | X | | | X |
| 2 | E3 | E3 | | X | | X |
| 3 | E2 | Intermediate State | X | | X | |
| 4 | E3 | E3 | | X | X | |
| 5 | EDS | EDS | | | X | |
| 6 | E2 | 0 | X | | | |
| 7 | E3 | 0 | | X | | |
| 8 | 0 | 0 | | | | X |

| Zustand | Gang EM1 | Gang EM2 | A' | B' | D | E |
|---|---|---|---|---|---|---|
| 1 | E1 | E1 | X |  |  | X |
| 2 | E2 | E2 |  | X |  | X |
| 3 | E1 | Intermediate State | X |  | X |  |
| 4 | E2 | Intermediate State |  | X | X |  |
| 5 | EDS | EDS |  |  |  | X |
| 6 | E1 | 0 | X |  |  |  |
| 7 | E2 | 0 |  | X |  |  |
| 8 | 0 | 0 |  |  |  | X |

DRIVE UNIT FOR A VEHICLE

RELATED APPLICATIONS

This application claims the benefit of and right of priority under 35 U.S.C. § 119 to German Patent Application no. 10 2024 202 039.7, filed on 5 Mar. 2024, the contents of which are incorporated herein by reference in its entirety.

FIELD OF THE DISCLOSURE

The invention relates to a drive unit for a vehicle, wherein the drive unit has two electrical machines, a manual gearbox with several gears and a differential. The invention also relates to a vehicle with such a drive unit.

BACKGROUND

For example, DE 10 2013 214 238 A1 discloses a drive unit for a vehicle, wherein the drive unit has several electrical machines, at least one planetary gear train and several positive-locking shifting elements. A first electrical machine is directly or indirectly, permanently coupled to a sun gear of a first planetary gear, wherein a second electrical machine is directly or indirectly coupled either to the sun gear of the first planetary gear or to a carrier of the first planetary gear, as a function of the shift position of a first positive-locking shift element and of a second positive-locking shift element. A hollow wheel of the first planetary gear is coupled either to a housing or to the web of the first planetary gear as a function of the shift position of a third positive-locking shift element and a fourth positive-locking shift element.

SUMMARY

The object of the present invention is to provide an alternative drive unit for a vehicle. In particular, the drive unit should be compact. The problem is solved by a drive unit as variously disclosed herein. Further advantageous embodiments will be apparent from the following description and the figures.

A drive unit for a vehicle according to the invention comprises a first electrical machine, a second electrical machine arranged axially parallel to the first, a manual gearbox arranged axially parallel to the two electrical machines and having several gears and at least a first planetary gear set, which has a first sun shaft, a first hollow gear shaft and a first web shaft, a differential with a differential input shaft and two differential output shafts, a drive shaft for connecting the first electrical machine to the manual gearbox, an output shaft for connecting the manual gearbox to the differential, a first positive-locking shift unit having a first shift element, a second shift element and a first sliding sleeve, which is displaceable by means of a first actuator into a respective one of three shift positions, wherein in a first shift position of the first sliding sleeve the first shift element is closed and the second electrical machine is connected with an actuating effect to a shaft of the first planetary gear set, wherein in a second shift position of the first sliding sleeve both shift elements are open and the second electrical machine is decoupled from the manual gearbox, wherein in a third shift position of the first sliding sleeve, the second shift element is closed and the second electrical machine is connected to the drive shaft with an actuating effect, wherein the first electrical machine is connected to the drive shaft via a first spur gear stage and a second spur gear stage, wherein the second electrical machine can be connected to a shaft of the first planetary gear set or to the drive shaft via a third spur gear stage and a fourth spur gear stage, wherein the first shift unit is arranged radially nested with the first spur gear stage and the third spur gear stage.

In particular, the first spur gear stage has a first spur gear and a second spur gear that engage in a tooth mesh with each other. Furthermore, the second spur gear stage has a third spur gear and a fourth spur gear, which are engaged in a tooth mesh with each other. The first spur gear is connected in a rotationally fixed manner, for example, to a rotor shaft of the first electrical machine, wherein the second and third spur gears are connected in a rotationally fixed manner, wherein the fourth spur gear is connected in a rotationally fixed manner to the drive shaft. In particular, the third spur gear stage has a fifth spur gear and a sixth spur gear that engage in a tooth mesh with each other. Furthermore, the fourth spur gear stage has a seventh spur gear and an eighth spur gear that engage in a tooth mesh with each other. The fifth spur gear, for example, is connected in a rotationally fixed manner to a rotor shaft of the second electrical machine, wherein the sixth and seventh spur gears are connected in a rotationally fixed manner, wherein the eighth spur gear can be connected in a rotationally fixed manner to a shaft of the first planetary gear set or to the drive shaft via the first shift unit. The shafts of the first planetary gear set are the first sun shaft, the first hollow gear shaft and the first web shaft. The first web shaft carries several planetary gears which mesh with the first sun shaft and with the first hollow gear shaft. i.e., engage in a tooth mesh.

For the purposes of the invention, a "shaft" is to be understood as a rotatable component of the transmission, via which associated components of the transmission are connected to each other in a rotationally fixed manner or via which such a connection can be established when one of the shift elements is actuated. The respective shaft can connect the components axially or radially or both axially and radially. The respective shaft can also be present as an intermediate piece, via which a respective component is connected radially, for example. The term "shaft" does not exclude the possibility that the components to be connected may be designed in one piece. In particular, two or more shafts connected to each other in a rotationally fixed manner can be designed in one piece.

A "shift element" is a shiftable device which, in a closed state, connects two shafts or a shaft and a housing to each other in a rotationally fixed manner and, in an open state, decouples the two shafts or the shaft and the stationary component from each other. Two shafts can then rotate relative to each other. The first shift unit has a neutral position between two gear positions, so that two gear positions and one neutral position are provided for three shift positions. In a neutral position, two shafts are decoupled from each other by the first shift unit, wherein the first sliding sleeve is then in a rotary engagement with a single shaft. In particular, the first actuator moves the first sliding sleeve to the first shift position, thereby coupling the second electrical machine to the manual gearbox and the differential. The first sliding sleeve is designed to be positive-locking and has positive-locking claws that interact in a positive-locking manner in the respective gear position with a respective corresponding claw toothing in order to set a rotationally fixed connection between two shafts. The respective claw toothing, with which the first sliding sleeve interacts in a positive-locking manner, is therefore to be understood as a shift element. Preferably, the first shift unit comprises an unsynchronized claw clutch. This means that both shift elements are designed as positive-locking shift elements. The efficiency of the drive unit can be increased due to reduced drag losses thanks to positive-locking shifting elements. In particular, positive-locking shift elements are more compact and efficiency-optimized and have a cost advantage over friction-locking shift elements. The use of a single sliding sleeve and a single actuator to shift the first and second shift elements further increases the compactness.

When the first shift element is closed. i.e. in the first shift position of the first sliding sleeve, the second electrical machine is connected with an actuating effect to a shaft of the first planetary gear set, in particular to the first hollow gear shaft or the first web shaft, wherein a torque summation of the two electrical machines is thereby made possible, wherein both electrical machines have the gears of the manual gearbox.

In the open state of the first and second shift element, i.e. in the second shift position or Neutral position of the first sliding sleeve, the second electrical machine is decoupled from the drive train, whereby, for example in a partial load operation, electrical losses as well as losses can be reduced by rotating bearings.

When the second shift element is closed, i.e. in the second shift position of the first sliding sleeve, the second electrical machine is connected to the drive shaft with an actuating effect, whereby the drive power of the second electrical machine can be introduced into the manual gearbox. In this way, the second electrical machine can drive the vehicle independently of the first electrical machine or support the tensile force during the shifting of the first electrical machine. This is generally known as "output-supported shifting" or "electromotive shifting" (EMS).

According to the invention, the first shift unit is arranged radially nested with the first spur gear stage and the third spur gear stage. Furthermore, the first spur gear stage and the third spur gear stage are radially nested on an outer circumference of the first shift unit in order to save axial space. As a result, the first shift unit, the first spur gear stage and the third spur gear stage are at least partially located in the same axial plane.

According to one embodiment, the manual gearbox also includes a third shift element and a fourth shift element, wherein the first sun shaft and the drive shaft are connected in a rotationally fixed manner, wherein the first web shaft and the output shaft are connected in a rotationally fixed manner, wherein the first web shaft and the output shaft are connected to the second electrical machine in the closed state of the first shift element, wherein the first hollow gear shaft is connected in a rotationally fixed manner to a stationary component in the closed state of the third shift element, wherein the first hollow gear shaft is connected, in a rotationally fixed manner, to the output shaft and the first web shaft in the closed state of the fourth shift element. A "stationary component" is a component that is fixed in a stationary position, in particular is connected to a housing or part of a housing in a rotationally fixed or integral manner. Reference is made to the embodiment shown in FIG. 11.

According to one embodiment, the manual gearbox also includes a third shift element and a fourth shift element, wherein the first sun shaft and the drive shaft are connected in a rotationally fixed manner, wherein the first web shaft and the output shaft are connected in a rotationally fixed manner, wherein the first hollow gear shaft is connected to the second electrical machine in the closed state of the first shift element, wherein the first hollow gear shaft is connected in a rotationally fixed manner to a stationary component when the third shift element is in the closed state, wherein the first hollow gear shaft is connected in a rotationally fixed manner to the output shaft and the first web shaft when the fourth shift element is in the closed state. Reference is made to the embodiment shown in FIG. 12.

According to one embodiment, the manual gearbox further comprises a second planetary gear set, a third shift element and a fourth shift element, wherein the second planetary gear set has a second sun shaft, a second hollow gear shaft and a second web shaft, wherein the first sun shaft, the second sun shaft and the drive shaft are connected in a rotationally fixed manner, wherein the first web shaft and the second hollow gear shaft are connected in a rotationally fixed manner, wherein the second web shaft and the output shaft are connected in a rotationally fixed manner, wherein the first hollow gear shaft is connected to the second electrical machine in the closed state of the first shift element, wherein the first hollow gear shaft is connected in a rotationally fixed manner to a stationary component when the third shift element is in the closed state, wherein the first hollow gear shaft is connected in a rotationally fixed manner to the second hollow gear shaft and the first web shaft when the fourth shift element is in the closed state, and the two planetary gear sets are thereby locked. To lock the two planetary gear sets, two of the three shafts of the respective planetary gear set can be connected to each other or a shaft of the first planetary gear set can be connected to a shaft of the second planetary gear set. When a planetary gear set is blocked, it rotates in the block. The manual gearbox thus has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiments according to FIG. 2a and FIG. 4.

According to one embodiment, the manual gearbox further comprises a second planetary gear set, a third shift element and a fourth shift element, wherein the second planetary gear set has a second sun shaft, a second hollow gear shaft and a second web shaft, wherein the first sun shaft, the second sun shaft and the drive shaft are connected in a rotationally fixed manner, wherein the first web shaft and the second hollow gear shaft are connected in a rotationally fixed manner, wherein the first web shaft and the second hollow gear shaft are connected in a rotationally fixed manner to a stationary component in the closed state of the third shift element, wherein the second web shaft and the output shaft are connected in a rotationally fixed manner, wherein the first hollow gear shaft is connected to the second electrical machine in the closed state of the first shift element, wherein the first hollow gear shaft is connected in a rotationally fixed manner to the stationary component in the closed state of the fourth shift element. The manual gearbox also has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiment shown in FIG. 3a.

According to one embodiment, the manual gearbox further comprises a second planetary gear set, a third shift element and a fourth shift element, wherein the second planetary gear set has a second sun shaft, a second hollow gear shaft and a second web shaft, wherein the first sun shaft and the drive shaft are connected in a rotationally fixed manner, wherein the first web shaft and the second sun shaft are connected in a rotationally fixed manner, wherein the second web shaft and the output shaft are connected in a rotationally fixed manner, wherein the second hollow gear shaft is connected in a rotationally fixed manner to a stationary component, wherein the first hollow gear shaft is connected to the second electrical machine in the closed state of the first shift element, wherein the first hollow gear shaft is connected to the second web shaft and the output shaft in a rotationally fixed manner in the closed state of the third shift element, wherein the first hollow gear shaft is connected to the second sun shaft and the first web shaft in a rotationally fixed manner in the closed state of the fourth shift element. The manual gearbox also has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiment shown in FIG. 7.

According to one embodiment, the manual gearbox also includes a second planetary gear set, a third shift element and a fourth shift element, wherein the second planetary gear set has a second sun shaft, a second hollow gear shaft and a second web shaft, wherein the first sun shaft and the drive shaft are connected in a rotationally fixed manner, wherein the first web shaft and the second sun shaft are connected in a rotationally fixed manner, wherein the first web shaft and the second sun shaft are connected to the second electrical machine in the closed state of the first shift element, wherein the second web shaft and the output shaft are connected in a rotationally fixed manner, wherein the second hollow gear shaft is connected in a rotationally fixed manner to a stationary component, wherein the first hollow gear shaft is connected in a rotationally fixed manner to the second web shaft and the output shaft when the third shift element is in the closed state, wherein the first hollow gear shaft is connected in a rotationally fixed manner to the second sun shaft and the first web shaft when the fourth shift element is in the closed state. The manual gearbox also has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiments according to FIG. 8 and FIG. 9.

The third and fourth shift elements are designed as gearshift elements and are thus set up to shift gears. When the third shift element is closed and the fourth shift element is open, first gear is engaged with a first transmission ratio. When the fourth shift element is closed and the third shift element is open, a second gear with a second transmission ratio is engaged.

According to one embodiment, the third shift element and the fourth shift element are combined to form a second positive-locking shift unit with an axially displaceable second sliding sleeve, wherein the second sliding sleeve is displaceable by means of a second actuator into a respective one of three shift positions. The second shift unit has a neutral position between two gear positions, so that with three shift positions, two gear positions and one neutral position are provided. In a neutral position, two shafts or a shaft and a stationary component are decoupled from one another by the second shift unit, wherein the second sliding sleeve is then in a rotary engagement with a single shaft or with the stationary component. In particular, a second actuator moves the second sliding sleeve into the respective shift position and thereby shifts two gears, wherein precisely one shift element of the second shift unit is closed to realize one gear. The second sliding sleeve is designed to be positive-locking and has positive-locking claws which, in the respective gear position, interact in a positive-locking manner with a respective corresponding claw toothing in order to set up a rotationally fixed connection between two shafts or a shaft and a stationary component. Consequently, the respective claw toothing with which the second sliding sleeve interacts in a positive-locking manner is to be understood as a shift element. Preferably, the second shift unit comprises an unsynchronized claw clutch. This means that all shift elements are designed as positive-locking shift elements. The efficiency of the manual gearbox can be increased by means of positive-locking shift elements due to reduced drag losses. In particular, positive-locking shift elements are more compact and efficiency-optimized and have a cost advantage over friction-locking shift elements. The use of a single sliding sleeve to shift two gears further increases compactness, wherein only a single actuator is needed for this. In this context, reference is made to the embodiments shown in FIG. 2a, FIG. 3a, FIG. 4, FIG. 7 through FIG. 9. FIG. 11 and FIG. 12.

According to one embodiment, the manual gearbox further comprises a second planetary gear set, a third shift element, a fourth shift element and a fifth shift element, the second planetary gear set having a second sun shaft, a second hollow gear shaft and a second web shaft, the first sun shaft, the second sun shaft and the drive shaft being connected in a rotationally fixed manner, wherein the first web shaft and the second hollow gear shaft are connected in a rotationally fixed manner, wherein the first web shaft and the second hollow gear shaft are connected in a rotationally fixed manner to a stationary component in the closed state of the third shift element, wherein the second web shaft and the output shaft are connected in a rotationally fixed manner, wherein the first hollow gear shaft is connected to the second electrical machine in the closed state of the first shift element, wherein the first hollow gear shaft is connected in a rotationally fixed manner to the stationary component in the closed state of the fourth shift element, wherein the first hollow gear shaft is connected to the second hollow gear shaft and the first web shaft in a rotationally fixed manner in the closed state of the fifth shift element, and the two planetary gear sets are thereby locked. The manual gearbox also has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiment shown in FIG. 5.

According to one embodiment, the manual gearbox further comprises a second planetary gear set, a third shift element, a fourth shift element and a fifth shift element, the second planetary gear set having a second sun shaft, a second hollow gear shaft and a second web shaft, the first sun shaft and the drive shaft being connected in a rotationally fixed manner, wherein the first web shaft and the second sun shaft are connected in a rotationally fixed manner, wherein the second web shaft and the output shaft are connected in a rotationally fixed manner, wherein the second hollow gear shaft is connected in a rotationally fixed manner to a stationary component, wherein the first hollow gear shaft is connected to the second electrical machine in the closed state of the first shift element, wherein the first hollow gear shaft is connected in a rotationally fixed manner to the stationary component in the closed state of the third shift element, wherein the first hollow gear shaft is connected to the second web shaft and the output shaft in a rotationally fixed manner in the closed state of the fourth shift element, wherein the first hollow gear shaft is connected to the second sun shaft and the first web shaft in a rotationally fixed manner in the closed state of the fifth shift element, and the to planetary gear sets are thereby locked. The manual gearbox also has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiment shown in FIG. 6.

According to one embodiment, the manual gearbox further comprises a second planetary gear set, a third shift element, a fourth shift element and a fifth shift element, the second planetary gear set having a second sun shaft, a second hollow gear shaft and a second web shaft, the first sun shaft and the drive shaft being connected in a rotationally fixed manner, wherein the first web shaft and the second sun shaft are connected in a rotationally fixed manner, wherein the first web shaft and the second sun shaft are connected to the second electrical machine in the closed state of the first shift element, wherein the second web shaft and the output shaft are connected in a rotationally fixed manner, wherein the second hollow gear shaft is connected in a rotationally fixed manner to a stationary component, wherein the first hollow gear shaft is connected in a rotationally fixed manner to the stationary component in the closed state of the third shift element, wherein the first hollow gear shaft is connected in a rotationally fixed manner to the second web shaft and the output shaft in the closed state of the fourth shift element, wherein the first hollow gear shaft is connected in a rotationally fixed manner to the second sun shaft and the first web shaft in the closed state of the fifth shift element, and the two planetary gear sets are thereby locked. The manual gearbox also has two planetary gear sets, wherein the two planetary gear sets are arranged axially adjacent to one another in order to save radial space. The second web shaft carries several planetary gears that mesh with the second sun shaft and the second hollow gear shaft. Reference is made to the embodiment shown in FIG. 10.

The third, fourth, and fifth shift elements are designed as gear shift elements and are thus set up to shift gears. When the third shift element is closed and the fourth and fifth shift elements are open, first gear is engaged with a first transmission ratio. When the fourth shift element is closed and the third and fifth shift elements are open, a second gear with a second transmission ratio is engaged. When the fifth shift element is closed and the third and fourth shift elements are open, a third gear with a third transmission ratio is engaged.

According to one embodiment, the third shift element, the fourth shift element and the fifth shift element are combined to form a second positive-locking shift unit with an axially displaceable second sliding sleeve, wherein the second sliding sleeve is displaceable by means of a second actuator into a respective one of five shift positions. The second shift unit has a neutral position between each of the two gear positions, so that with five shift positions, three gear positions and two neutral positions are provided. In a respective neutral position, two shafts or a shaft and a stationary component are decoupled from one another by the second shift unit, wherein the second sliding sleeve is then in a rotary engagement with a single shaft or with the stationary component. In particular, the second actuator moves the second sliding sleeve to the respective shift position, thereby realizing three gears. The second sliding sleeve is designed to be positive-locking and has positive-locking claws which, in the respective gear position, interact in a positive-locking manner with a respective corresponding claw toothing in order to set up a rotationally fixed connection between two shafts or a shaft and a stationary component. Consequently, the respective claw toothing with which the second sliding sleeve interacts in a positive-locking manner is to be understood as a shift element. Preferably, the second shift unit comprises an unsynchronized claw clutch. This means that the three shift elements are designed as positive-locking shift elements. The use of a single sliding sleeve and a single actuator to shift three gears further increases compactness. In this context, reference is made to the embodiments according to FIG. 5, FIG. 6 and FIG. 10.

According to one embodiment, the differential is arranged coaxially with the manual gearbox and the third differential output shaft is guided axially through the manual gearbox, wherein the differential input shaft is connected to the output shaft in a rotationally fixed manner. This makes the drive unit particularly compact. In this context, reference is made to the embodiments according to FIG. 2a, FIG. 3a and FIG. 5 to FIG. 12.

According to a preferred embodiment, the differential is designed as a ball or bevel gear differential. A differential designed as a ball or bevel gear differential has two output elements on the wheel side, in particular a first output gear and a second output gear. The two output gears each mesh with a balancing element. The balancing elements are mounted in a differential cage so that they can rotate about their own axle. The respective output gear is connected to the respective differential output shaft in a rotationally fixed manner. The differential is driven via the differential cage, which is configured as a differential input shaft. Furthermore, alternative forms of differential training are also conceivable, for example as a spur gear differential or planetary differential. The drive power fed into the differential via the differential input shaft is distributed in the usual way between the two differential output shafts and transmitted to the axle's drive wheels. The differential output shafts are configured to be connected to the drive gears of the vehicle with an actuating effect. The respective differential output shaft can be connected directly or indirectly or indirectly via a downstream fixed transmission ratio, a joint shaft, a drive shaft and/or a wheel hub to the associated vehicle wheel.

According to one embodiment, the differential is arranged transversely to the manual gearbox, wherein the differential input shaft is connected to the output shaft via a bevel gear stage. Reference is made to the embodiment shown in FIG. 4.

A vehicle according to the invention comprises one drive unit according to the invention. The above definitions and explanations of technical effects, advantages, and advantageous embodiments of the drive unit according to the invention also apply mutatis mutandis to the vehicle according to the invention.

BRIEF DESCRIPTION OF THE DRAWINGS

Advantageous embodiments of the invention, which are explained below, are shown in the drawings, wherein identical or similar elements are provided with the same reference numerals. The following are shown:

FIG. 2b: a shift matrix for the drive unit according to FIG. 2a;

FIG. 3a: a highly abstract schematic view of a drive unit according to the invention according to a second embodiment.

FIG. 3b: a shift matrix for the drive unit according to FIG. 3a,

FIG. 4: a highly abstract schematic view of a drive unit according to the invention in accordance with a third embodiment;

DETAILED DESCRIPTION

Figure 1:
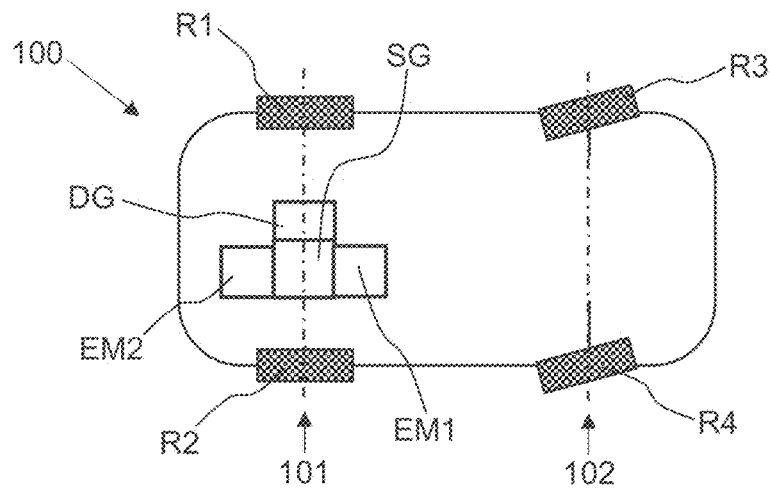
FIG. 1: a highly abstract schematic view of a vehicle with a drive axle, which has a drive unit according to the invention.

FIG. 1 shows a vehicle 100 with a first axle 101 with two vehicle wheels R1, R2 and a second axle 102 with two vehicle wheels R3, R4. In the present case, the first axle 101 is designed as the rear drive axle of the vehicle 100 and is equipped with a drive unit according to the invention. The drive unit comprises a first and a second electrical machine EM1, EM2, each of which is designed to generate a drive power, a manual gearbox SG with two gears and a differential DG. The vehicle 100 is therefore designed as an electric vehicle, i.e., a vehicle that can be actuated electrically. The drive unit is arranged transversely to the longitudinal direction of the vehicle and is connected to the vehicle wheels R1, R2 of the first axle 101 with an actuating effect. A detailed embodiment of this drive unit is shown in FIG. 2. Alternatively, as shown in more detail in FIG. 4, the differential DG can be arranged transversely to the longitudinal direction of the vehicle.

In the present case, no further drive unit is arranged on the second axle 102. i.e. on the front axle of the vehicle 100, which saves costs, weight and installation space. Alternatively, the drive unit can be arranged on the front axle of the vehicle 100 instead of the rear axle. To implement an all-wheel drive system, a further drive unit can be arranged on the second axle 102 and connected to the vehicle wheels R3, R4 of this axle 102 with an actuating effect.

Figure 2A:
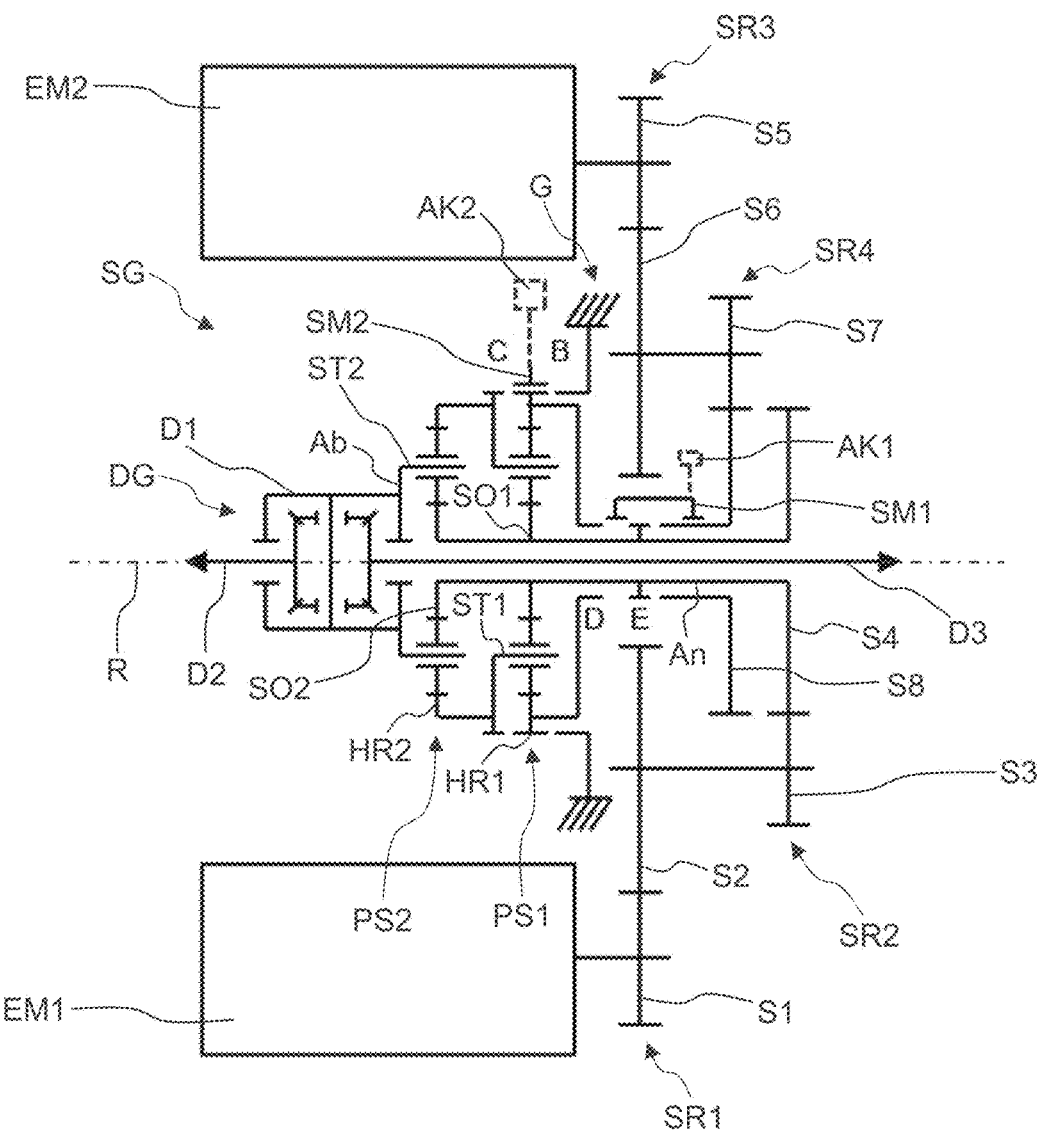
FIG. 2a: a highly abstract schematic view of a drive unit according to the invention in accordance with a first embodiment.

FIG. 2a shows the drive unit according to a first embodiment. The drive unit comprises a drive shaft An for connecting the first electrical machine EM1 to the manual gearbox SG, an output shaft Ab for connecting the manual gearbox SG to the differential DG and a first positive-locking shift unit having a first shift element D, a second shift element E and a first sliding sleeve SM1, which is displaceable by means of a first actuator AK1 into a respective one of three shift positions. The differential DG has a differential input shaft D1 and two differential output shafts D2, D3, wherein the differential DG is arranged coaxially with the manual gearbox SG and the third differential output shaft D3 is guided axially through the manual gearbox SG, thereby making the drive unit even more compact. In particular, the drive shaft An is designed as a hollow shaft for this purpose. The differential input shaft D1 is connected to the output shaft Ab in a rotationally fixed manner.

The differential DG is designed as a ball or bevel gear differential. The differential input shaft D1 is designed as a differential cage. The differential DG, designed as a ball or bevel gear differential, has two output elements on the wheel side, in particular a first output gear and a second output gear. The two output gears each mesh with a balancing element. The balancing elements are mounted in the differential cage so that they can rotate about their own axle. The respective output gear is connected to the respective differential output shaft D2, D3 in a rotationally fixed manner. Consequently, the differential DG is driven via the differential cage, which is connected to the output shaft Ab in a rotationally fixed manner. Arrows on the differential output shafts D2, D3 indicate a connection to a respective vehicle wheel of this vehicle axle.

The manual gearbox SG has a first planetary gear set PS1 and a second planetary gear set PS2. The two planetary gear sets PS1 and PS2 are arranged axially adjacent to one another in order to save space and increase compactness. The first planetary gear set PS1 comprises three shafts, namely a first sun shaft SOL a first hollow gear shaft HR1, and a first web shaft ST1. The first web shaft ST1 carries several planetary gears which mesh with the first sun shaft SQL and with the first hollow gear shaft HR1, i.e., engage in a tooth mesh. The second planetary gear set PS2 also comprises three shafts, namely a second sun shaft SO2, a second hollow gear shaft HR2, and a second web shaft ST2. The second web shaft ST2 carries several planetary gears that mesh with the second sun shaft SO2 and the second hollow gear shaft HR2.

The first electrical machine EM1 is connected to the drive shaft An via a first spur gear stage SR1 and a second spur gear stage SR2. In the present case, the first spur gear stage SR1 has a first spur gear S1 and a second spur gear S2, which are engaged in a tooth mesh with each other. Furthermore, the second spur gear stage SR2 has a third spur gear S3 and a fourth spur gear S4, engage in a tooth mesh with each other. The first spur gear S1 is connected in a rotationally fixed manner to a rotor shaft of the first electrical machine EM1, wherein the second and the third spur gears S2, S3 are connected in a rotationally fixed manner, wherein the fourth spur gear S4 is connected to the drive shaft An in a rotationally fixed manner.

The second electrical machine EM2 can be connected to the first hollow gear shaft HR1 or to the drive shaft An via the third spur gear stage SR3 and the fourth spur gear stage SR4. Furthermore, the third spur gear stage SR3 has a fifth spur gear S5 and a sixth spur gear S6, which are engaged in a tooth mesh with each other. The fourth spur gear stage SR4 has a seventh spur gear S7 and an eighth spur gear S8, which are engaged in a tooth mesh with each other. The fifth spur gear S5 is connected in a rotationally fixed manner to a rotor shaft of the second electrical machine EM2, wherein the sixth and seventh spur gears S6, S7 are connected in a rotationally fixed manner, wherein the eighth spur gear S8 can be connected in a rotationally fixed manner to the hollow gear shaft HR1 or to the drive shaft An via the first shift unit. When the first shift element D is closed, the eighth spur gear S8 is connected to the first hollow gear shaft HR11 in a rotationally fixed manner. When the second shift element F is closed, the eighth spur gear S8 is connected to the drive shaft An in a rotationally fixed manner. The first shift unit is arranged radially nested with the first spur gear stage SR1 and the third spur gear stage SR3 in order to save axial space.

The drive shaft An, the output shaft Ab, the manual gearbox SG and the differential DG are arranged on a common axis of rotation R and are thus coaxial to one another. The two electrical machines EM1, EM2 are arranged axially parallel to the axis of rotation R. In accordance with an axial sequence, the second planetary gear set PS2 is arranged axially adjacent to the differential DG, wherein the first planetary gear set PS1 is arranged axially adjacent to the second planetary gear set PS2, wherein the first shift unit is arranged axially adjacent to the first planetary gear set PS1, wherein the fourth spur gear stage SR4 is arranged axially adjacent to the first shift unit, wherein the second spur gear stage SR2 is arranged axially adjacent to the first spur gear stage SR1.

In the first shift position of the first sliding sleeve SM1, the first shift element D is closed, wherein the second electrical machine EM2 is connected with an actuating effect to the first hollow gear shaft HR1. In a second shift position of the first sliding sleeve SM1, both shift elements D, E are open, wherein the second electrical machine EM2 is thereby decoupled from the manual gearbox SG. This second shift position of the first sliding sleeve SM1 is shown in FIG. 2a In the third shift position of the first sliding sleeve SM1, the second shift element E is closed and the second electrical machine EM2 is connected with an actuating effect to the drive shaft An.

The manual gearbox SG also has a third shift element B and a fourth shift element C, wherein the third shift element B and the fourth shift element C are combined into a second shift unit. The two planetary gear sets PS1 and 2 are arranged axially adjacent to one another in order to save space and increase compactness. Furthermore, the second shift unit is arranged radially stacked on a circumference of the first planetary gear set PS1 and is thus arranged at least partially m a common axial plane with the first planetary gear set PS1, whereby axial space is saved.

The first sun shaft SO1, the second sun shaft SO2 and the drive shaft An are connected in a rotationally fixed manner. The first web shaft ST1 and the second hollow gear shaft HR2 are connected in a rotationally fixed manner. The second web shaft ST2 and the output shaft Ab are connected in a rotationally fixed manner. When the third shift element B is in a closed state, the first hollow gear shaft HR1 is connected in a rotationally fixed manner to a stationary component designed as a housing G. When the fourth shift element C is closed, the two planetary gear sets PS1, PS2 are blocked, wherein in the present case the second hollow gear shaft HR2 and the first web shaft ST1 are connected to the first hollow gear shaft HR1 in a rotationally fixed manner.

The second shift unit has a second sliding sleeve SM2 and three shift positions, namely two gear positions and a neutral position. The second sliding sleeve SM2 is arranged in a radially nested fashion on the outer circumference of the first planetary gear set PS1 in order to save axial space and thus increase axial compactness. The neutral position is located between the two gear positions. The three shift positions are realized by axially displacing the second sliding sleeve SM2. The second sliding sleeve SM2 has claw shift elements and is axially displaceable into the respective shift position by means of a second actuator AK2. All three shift positions of the second shift unit are arranged linearly. The two gears are shifted sequentially by moving the second sliding sleeve SM2 in an axial direction, past the neutral position. This not only saves weight and components, but also costs, installation space, and assembly work.

When the third shift element B is closed, a first gear is engaged with a first transmission ratio, wherein in the first gear the first hollow gear shaft HR1 is connected in a rotationally fixed manner to the stationary component designed as the housing G. When the fourth shift element C is closed, a second gear is engaged with a second transmission ratio, wherein in the second gear the first hollow gear shaft HR1 is connected to the first web shaft ST1 and the second hollow gear shaft HR2 in a rotationally fixed manner.

First gear is engaged when the second sliding sleeve SM2 is in a first gear position, i.e., in a first shift position. The third shift element B connects the first hollow gear shaft HR1 to the stationary component in order to shift the first gear in an actuated or closed state, i.e. in the first shift position of the second sliding sleeve SM2.

The first gear is selected by moving the second sliding sleeve SM2 axially into the neutral position, i.e., into a second shift position. In the second shift position of the second sliding sleeve SM2, the second sliding sleeve SM2 is only in a rotary engagement with the first hollow gear shaft HR1. In this neutral position, the shift elements B, C are open. This second shift position of the second sliding sleeve SM2 is shown in FIG. 2.

The second gear is engaged by moving the second sliding sleeve SM2 axially into a second gear position. i.e., into a third shift position. The fourth shift element C connects the first hollow gear shaft HR1 to the first web shaft ST1 and the second hollow gear shaft HR2 in an actuated or closed state, i.e. in the third shift position of the second sliding sleeve SM2, in order to shift to second gear.

Figures 2B, 3A:
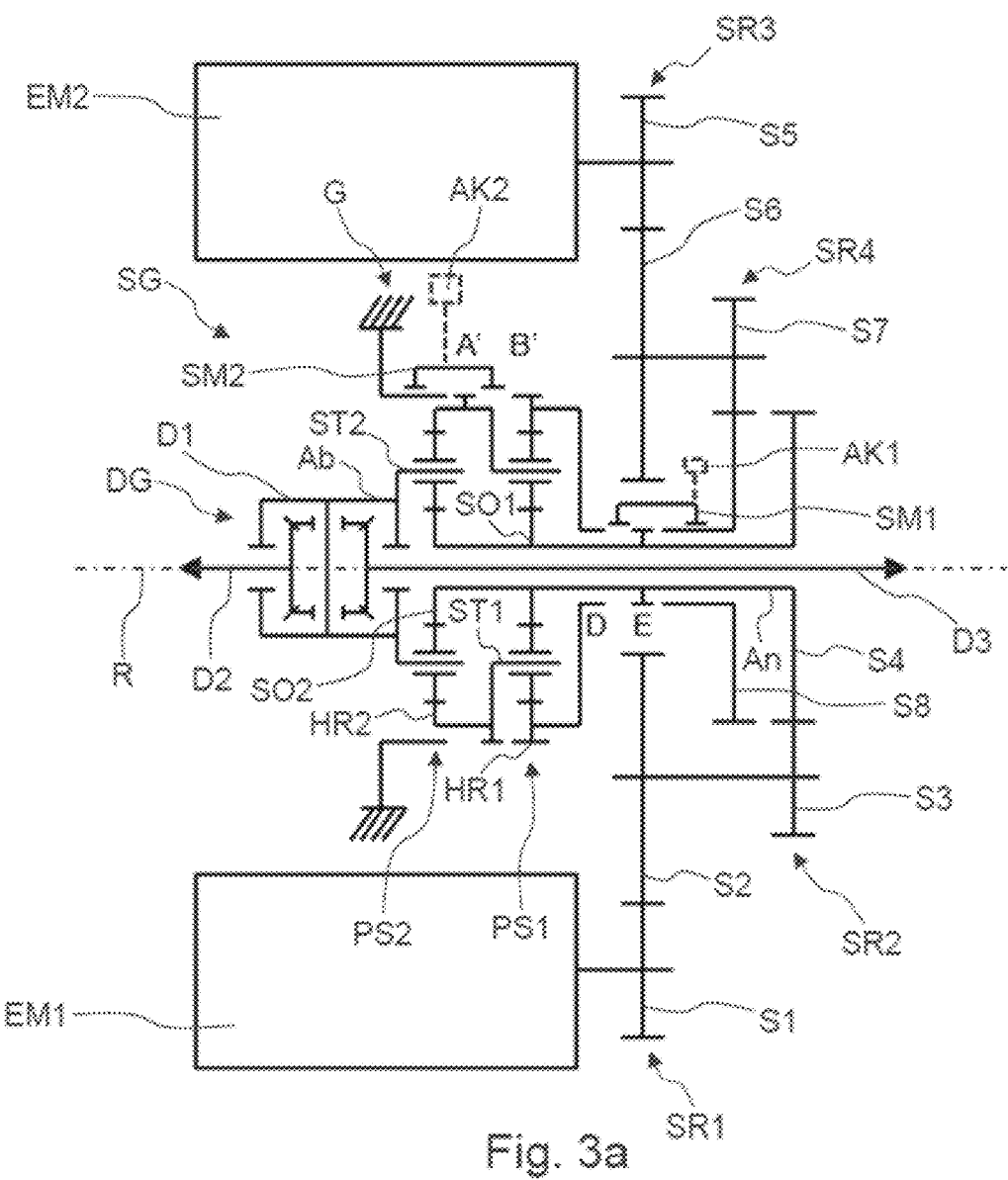

FIG. 2b shows a shift matrix for the drive unit according to FIG. 2a The columns of the shift matrix show the respective state of the drive unit, the respective gear for the first electrical machine EM1, the respective gear for the second electrical machine EM2 and the four shift elements B, C, D, E of the drive unit according to FIG. 2a. Depending on the shift position of the four shift elements B, C, D, E, a total of eight states can be realized for the drive unit.

In the first state of the drive unit, the second shift element E and the third shift element B are closed, wherein the first shift element D and the fourth shift element C are open. This means that the first electrical machine EM1 and the second electrical machine EM2 are both set to the second gear E2.

In a second state of the drive unit, the second shift element E and the fourth shift element C are closed, wherein the first shift element D and the third shift element B are open. This means that the first electrical machine EM1 and the second electrical machine EM2 are both set to the second gear E3.

In a third state of the drive unit, the first shift element D and the third shift element B are closed, wherein the second shift element E and the fourth shift element C are open. This means that a gear E2 is engaged for the first electrical machine EM1, wherein the second electrical machine EM2 is in an intermediate state. In this intermediate state, the second electrical machine EM2 is braked.

In a fourth state of the drive unit, the first shift element D and the fourth shift element C are closed, wherein the second shift element E and the third shift element B are open. This means that the first electrical machine EM1 and the second electrical machine EM2 are both set to the second gear E3.

In a fifth state of the drive unit, only the first shift element D is closed, wherein the second shift element E, the third shift element B and the fourth shift element C are open. As a result, an EDS mode is activated for the first electrical machine EM1 as well as for the second electrical machine EM2. In an EDS (electrodynamic shifting) mode, the two electrical machines EM1, EM2 are in a speed superimposition mode and back up each other's torque, wherein the torque ratio is fixed and the speed is variable.

In a sixth state of the drive unit, only the third shift element B is closed, wherein the first shift element D, the second shift element E and the fourth shift element C are open. This means that a gear. E2, is engaged for the first electrical machine. EM1, wherein the second electrical machine. EM2, is decoupled from the drive train.

In a seventh state of the drive unit, only the fourth shift element C is closed, wherein the first shift element D, the second shift element E and the third shift element B are open. This means that a gear, E3, is engaged for the first electrical machine. EM1, wherein the second electrical machine, EM2, is decoupled from the drive train.

In an eighth state of the drive unit, only the second shift element E is closed, wherein the first shift element D, the third shift element B and the fourth shift element C are open. As a result, both electrical machines EM1, EM2 are decoupled from the drive train. Likewise, all shift elements B, C, D, E can be open to decouple both electrical machines EM1, EM2 from the drive train.

The following is an example of the switching sequence with the power shift from gear E2 of the first electrical machine EM1 to gear E3 of the first electrical machine EM1. In the initial state, both electrical machines EM1, EM2 are in gear E2 (state 1 in the shift matrix). The second electrical machine EM2 is reconnected via the first shift unit, wherein the second shift element E is opened and the first shift element D is closed. The second electrical machine synchronizes the shift elements of the first shift unit. While the second electrical machine EM2 is being reconnected, the first electrical machine EM1 can support the tensile force. The second electrical machine EM2 is braked to a speed of zero. The third shift element B is relieved and then opened by the appropriate torque ratio of the first electrical machine EM1 to the second electrical machine EM2, wherein the fifth state according to the shift matrix is achieved. In the fifth state, both electrical machines EM1 and EM2 are in an EDS mode that is used for load shifting from gear E2 to gear E3. The speed of the first electrical machine EM1 is synchronized to the level of the target gear E3, wherein the fourth shift element C is then closed, whereby the fourth state according to the shift matrix is achieved. Both electrical machines EM1, EM2 have the same speed, since the first planetary gear set PS1 is integrated in the block. The second electrical machine EM2 can optionally be rerouted from the first shift unit from the first shift element D to the second shift element E, wherein the speed of the second electrical machine EM2 does not change. This state is useful, for example, when a power-interrupted shift in gear E2 occurs, as in the first state, in which the second shift element E remains closed. This opens the fourth shift element C, synchronizes the E2 gear and closes the second shift element B.

FIG. 3a shows a second embodiment of the drive unit according to the invention. The drive unit according to FIG. 3a is essentially the same as the drive unit according to FIG. 2a, wherein the difference between these two embodiments lies in the design of the manual gearbox SG. In the present case, the manual gearbox SG has a third shift element A' and a fourth shift element B', which are combined in a second shift unit. When the third shift element A' is in a closed state, the second hollow gear shaft HR2 and the first web shaft ST1 are connected to a stationary component designed as a housing G in a rotationally fixed manner. When the fourth shift element B' is in a closed state, the first hollow gear shaft HR1 is connected to the stationary component designed as a housing G in a rotationally fixed manner. Consequently, the fourth shift element B' according to FIG. 3a corresponds to the third shift element B according to FIG. 2a. Otherwise, the exemplary embodiment according to FIG. 3 corresponds to the exemplary embodiment according to FIG. 2, to which reference is made.

Figures 3B, 4:
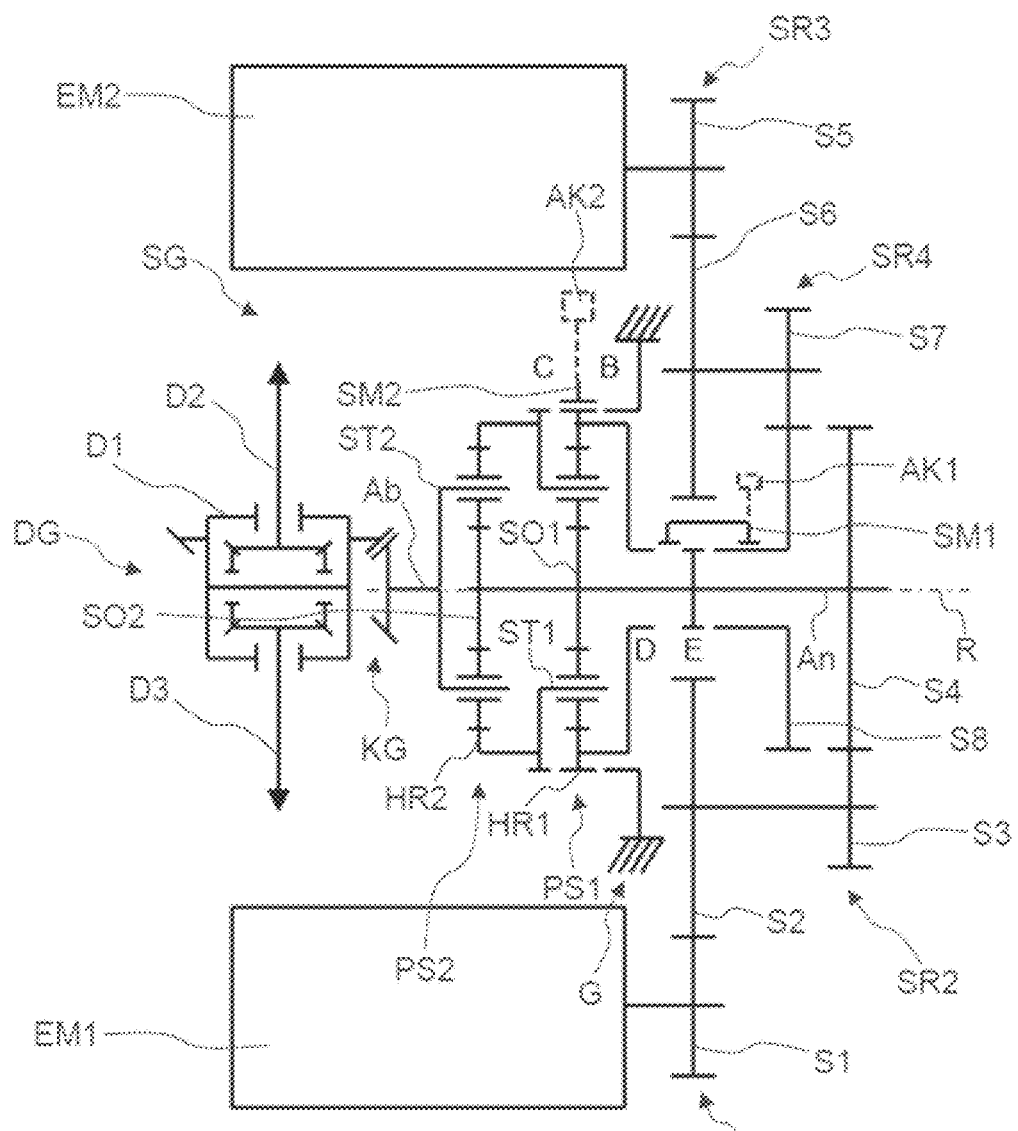

FIG. 3b shows a shift matrix for the drive unit according to FIG. 3a. The columns of the shift matrix show the respective state of the drive unit, the respective gear for the first electrical machine EM1, the respective gear for the second electrical machine EM2 and the four shift elements A', B', D, E of the drive unit according to FIG. 2a. Depending on the shift position of the four shift elements A', B', D, E, a total of eight states can be realized for the drive unit.

In a first state of the drive unit, the second shift element E and the third shift element E are closed, wherein the first shift element A' and the fourth shift element B' are open. This means that the first electrical machine EM1 and the second electrical machine EM2 are both set to the second gear E1.

In a second state of the drive unit, the second shift element E and the fourth shift element B' are closed, wherein the first shift element D and the third shift element A' are open. This means that the first electrical machine EM1 and the second electrical machine EM2 are both set to the second gear E2.

In a third state of the drive unit, the first shift element D and the third shift element A' are closed, wherein the second shift element E and the fourth shift element B' are open. This means that a gear E1 is engaged for the first electrical machine EM1, wherein the second electrical machine EM2 is in an intermediate state. In this intermediate state, the second electrical machine, EM2, turns in reverse.

In a fourth state of the drive unit, the first shift element D and the fourth shift element B' are closed, wherein the second shift element E and the third shift element A' are open. This means that a gear E2 is engaged for the first electrical machine EM1, wherein the second electrical machine EM2 is in an intermediate state. In this intermediate state, the second electrical machine EM2 is braked.

In a fifth state of the drive unit, only the first shift element D is closed, wherein the second shift element E, the third shift element A' and the fourth shift element B' are open. As a result, an EDS mode is activated for the first electrical machine EM1 as well as for the second electrical machine EM2. In an EDS (electrodynamic shifting) mode, the two electrical machines EM1, EM2 are in a speed superimposition mode and back up each other's torque, wherein the torque ratio is fixed and the speed is variable.

In a sixth state of the drive unit, only the third shift element A' is closed, wherein the first shift element D, the second shift element E and the fourth shift element B' are open. This means that a gear, E1, is engaged for the first electrical machine. EM1, wherein the second electrical machine. EM2, is decoupled from the drive train.

In a seventh state of the drive unit, only the fourth shift element B' is closed, wherein the first shift element D, the second shift element E and the third shift element A' are open. This means that a gear, E2, is engaged for the first electrical machine. EM1, wherein the second electrical machine, EM2, is decoupled from the drive train.

In an eighth state of the drive unit, only the second shift element E is closed, wherein the first shift element D, the third shift element A' and the fourth shift element B' are open. As a result, both electrical machines EM1, EM2 are decoupled from the drive train. Likewise, all shift elements A', B', D, E can be open to decouple both electrical machines EM1, EM2 from the drive train.

The following is an example of the switching sequence with power switching from gear E1 of the first electrical machine EM1 to gear E2 of the first electrical machine EM1. In the initial state, both electrical machines EM1, EM2 are in gear E1 (state 1 in the shift matrix). The second electrical machine EM2 is reconnected via the first shift unit, wherein the second shift element E is opened and the first shift element D is closed (state 3 in the shift matrix). The second electrical machine EM2 synchronizes the shift elements of the first shift unit. While the second electrical machine EM2 is being reconnected, the first electrical machine EM1 can support the tensile force. The second electrical machine EM2 has a fixed speed ratio to the output. In the third state, a mechanical gear with a lower transmission ratio than the two gears E1, E2 acts on the second electrical machine EM2. The third state could also serve as the driving state for a longer period of time, for example, when there is an efficiency advantage, especially when the second electrical machine EM2 has a lower speed than the first electrical machine EM1. The third shift element A' is relieved and then opened by the appropriate torque ratio of the first electrical machine EM1 to the second electrical machine EM2, wherein the fifth state according to the shift matrix is achieved. In the fifth state, both electrical machines EM1 and EM2 are in an EDS mode that is used for load shifting from gear E1 to gear E2. In principle, it is also possible to drive for longer periods in EDS mode. Both electrical machines, EM1 and EM2, can, for example, have the same speed. This state is also suitable for higher speeds, since the speed ratio of the input to the output corresponds to a direct gear ratio when both planetary gear sets PS1, PS2 rotate in the block at the same speed as the electrical machines EM1, EM2. The speed of the first electrical machine EM1 is synchronized to the level of the target gear E2, wherein the fourth shift element B' is then closed, whereby the fourth state according to the shift matrix is achieved. The second electrical machine EM2 is coupled via the first shift unit from the first shift element D to the second shift element E, whereby the second state is achieved, wherein the second electrical machine EM2 synchronizes the shift elements E, D of the first shift unit. While the second electrical machine EM2 is being reconnected, the first electrical machine EM1 can support the tensile force. After that, the two electrical machines EM1 and EM2 are located in gear E2.

FIG. 4 shows a third embodiment of the drive unit according to the invention. The drive unit according to FIG. 4 essentially corresponds to the drive unit according to FIG. 2a, wherein a difference between these two embodiments consists in the arrangement and connection of the differential DG. In the present case, the differential DG is connected to the output shaft Ab via a bevel gear stage KG and is thus arranged transversely to the manual gearbox SG. As in the embodiment according to FIG. 2a, the differential DG is also designed as a ball or bevel gear differential and has a differential input shaft D1 and two differential output shafts D2, D3. The differential input shaft D1 is designed as a differential cage and is connected in a rotationally fixed manner to a bevel gear of the bevel gear stage KG, wherein the other bevel gear of the bevel gear stage KG is connected in a rotationally fixed manner to the output shaft Ab, and wherein the two bevel gears engage in a tooth mesh. The manual gearbox SG is arranged in the longitudinal direction of the vehicle, wherein the differential DG is arranged in the transverse direction of the vehicle. The output shaft Ab does not have to be designed as a hollow shaft and can in particular be designed as a solid shaft, since the second differential output shaft D3 does not pass through it. Otherwise, the exemplary embodiment according to FIG. 4 corresponds to the exemplary embodiment according to FIG. 2a, to which reference is made.

Figure 5:
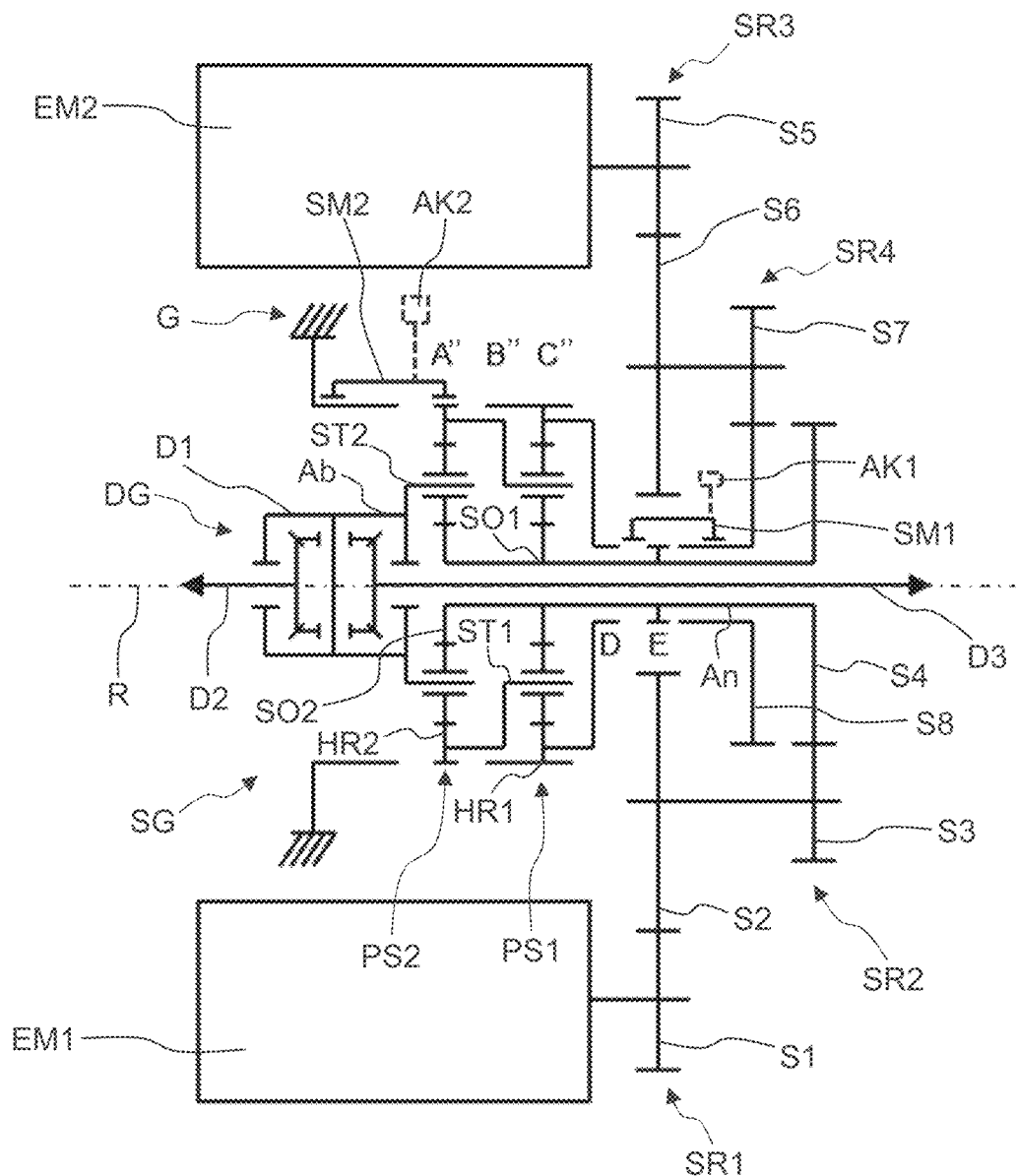
FIG. 5: a highly abstract schematic view of a drive unit according to the invention according to a fourth embodiment.

FIG. 5 shows a fourth embodiment of the drive unit according to the invention. The drive unit according to FIG. 5 is essentially the same as the drive unit according to FIG. 2a, wherein the difference between these two embodiments lies in the design of the manual gearbox SG. In the present case, the manual gearbox SG has a third shift element A", a fourth shift element B" and a fifth shift element C", which are combined in a second shift unit.

When the third shift element A" is in a closed state, the second hollow gear shaft HR2 and the first web shaft ST1 are connected to a stationary component designed as a housing G in a rotationally fixed manner. Consequently, the third shift element A" according to FIG. 5 corresponds to the third shift element A' according to FIG. 3a. When the fourth shift element B" is in a closed state, the first hollow gear shaft HR1 is connected to the stationary component designed as a housing G in a rotationally fixed manner. Consequently, the fourth shift element B" according to FIG. 5 corresponds to the third shift element B according to FIG. 2a. When the fifth shift element C" is in the closed state, the second hollow gear shaft HR2 and the first web shaft ST1 are connected to the first hollow gear shaft HR1 in a rotationally fixed manner. Consequently, the fifth shift element C" according to FIG. 5 corresponds to the fourth shift element C according to FIG. 2a. The shift matrices according to FIG. 2b and FIG. 3b can be combined (union). Three gears E1, E2, E3 are available for the two electric machines EM1, EM2 with EDS load-shifting function.

The second shift unit has five shift positions, namely three gear positions and two neutral positions. The respective neutral position is arranged between two respective gear positions. The five shift positions are realized by axially displacing the second sliding sleeve SM2. The second sliding sleeve SM2 has claw shift elements and is axially displaceable into the respective shift position by means of the second actuator AK2. All five shift positions of the second shift unit are arranged linearly. The three gears are shifted sequentially by moving the second sliding sleeve SM2 in an axial direction, past the neutral position. This not only saves weight and components, but also costs, installation space, and assembly work.

In the closed state of the third shift element A", a first gear with a first transmission ratio is engaged. In the closed state of the fourth shift element B" a second gear with a second transmission ratio is engaged. In the closed state of the fifth shift element C" a third gear with a third transmission ratio is engaged.

First gear is engaged when the second sliding sleeve SM2 is in a first gear position, i.e., in a first shift position. The third shift element A" connects the first web shaft ST1 and the second hollow gear shaft HR2 to the stationary component in order to shift the first gear in an actuated or closed state, i.e. in the first shift position of the second sliding sleeve SM2. This first shift position of the second sliding sleeve SM2 is shown in FIG. 5.

The first gear is selected by moving the second sliding sleeve SM2 axially into the first neutral position, i.e., into a second shift position. In the second shift position of the second sliding sleeve SM2, the second sliding sleeve SM2 is only in a rotary engagement with the stationary component. In this neutral position, the shift elements A", B", C" are open, so that no gear is engaged and a target gear can be synchronized.

The second gear is engaged by moving the second sliding sleeve SM2 axially into a second gear position, i.e., into a third shift position. The fourth shift element B" connects the first hollow gear shaft HR1 to the stationary component in order to shift into second gear when it is actuated or closed. i.e. in the third shift position of the second sliding sleeve SM2.

The second gear is selected by moving the second sliding sleeve SM2 axially into the second neutral position. i.e., into a fourth shift position. In the fourth shift position of the second sliding sleeve SM2, the second sliding sleeve SM2 is only in a rotary engagement with the first hollow gear shaft HR1. In this neutral position, the shift elements A", B", C" are open, so that no gear is engaged and a target gear can be synchronized.

The third gear is engaged by moving the second sliding sleeve SM2 axially into a third gear position. i.e., into a fifth shift position. The fifth shift element C" connects the first hollow gear shaft HR1, the second hollow gear shaft HR2 and the first web shaft ST1 in an actuated or closed state. i.e. in the fifth shift position of the second sliding sleeve SM2, in order to shift the third gear. This locks the two planetary gear sets PS1, PS2. The two planetary gear sets PS1, PS2 also rotate in the block.

Consequently, only the second sliding sleeve SM2 and the second actuator AK2 are required to switch the three mechanical gears. Otherwise, the exemplary embodiment according to FIG. 5 corresponds to the exemplary embodiment according to FIG. 2a, to which reference is made.

Figure 6:
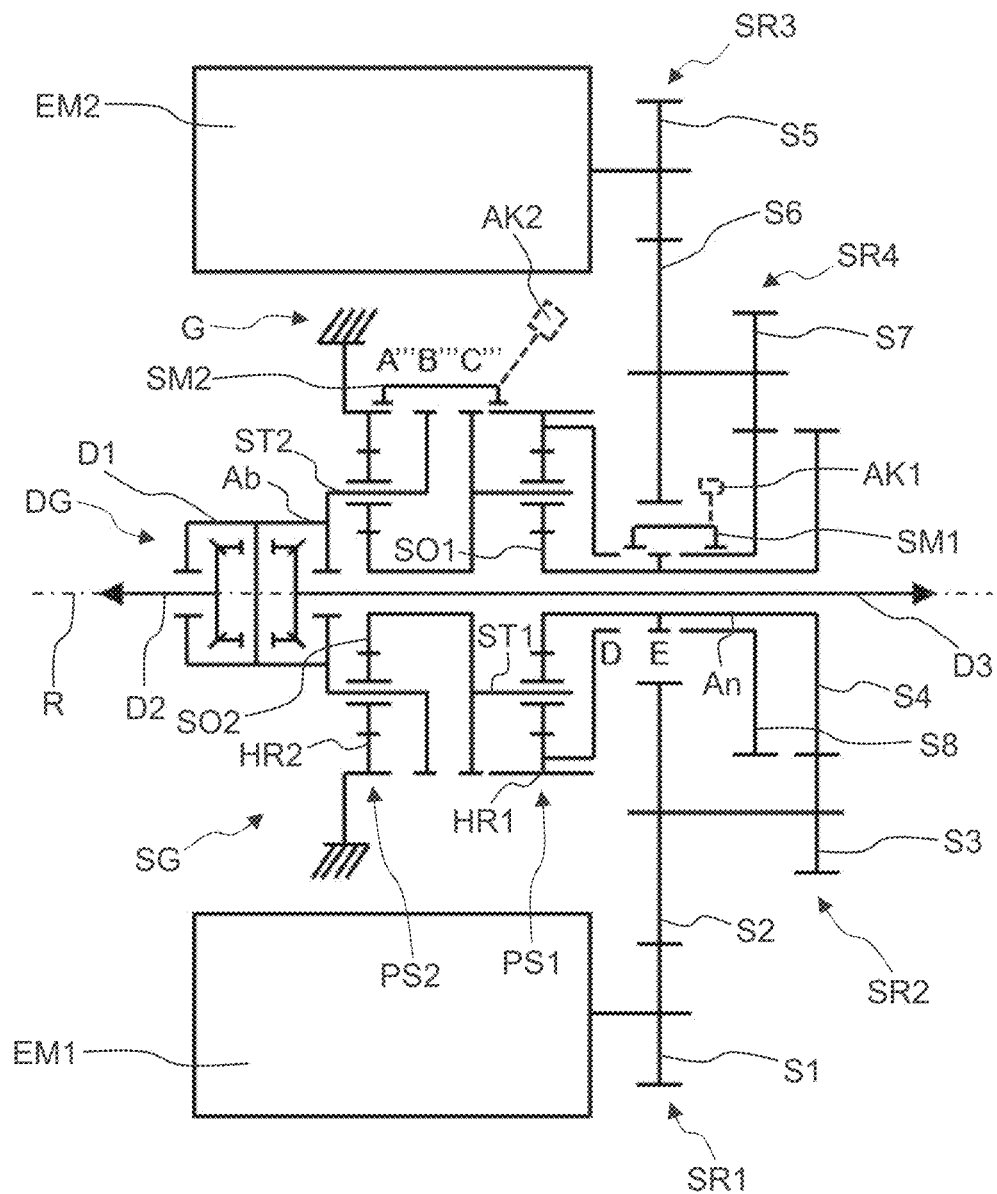
FIG. 6: a highly abstract schematic view of a drive unit according to the invention according to a fifth embodiment.

FIG. 6 shows a fifth embodiment of the drive unit according to the invention. The drive unit according to FIG. 6 is essentially the same as the drive unit according to FIG. 2a, wherein the difference between these two embodiments lies in the design of the manual gearbox SG. The manual gearbox SG also has two planetary gear sets PS1, PS2 and a second shift unit with three shift elements A''', B''', C'''. The first sun shaft SO1 and the drive shaft An are connected in a rotationally fixed manner. The first web shaft ST1 and the second sun shaft SO2 are connected in a rotationally fixed manner. The second web shaft ST2 and the output shaft Ab are connected in a rotationally fixed manner. The second hollow gear shaft HR2 is connected to a stationary component designed as housing G in a rotationally fixed manner. The first hollow gear shaft HR1 is connected to the second electrical machine EM2 in the closed state of the first shift element D. The first hollow gear shaft HR1 is connected to the stationary component in a rotationally fixed manner when the third shift element A''' is in the closed state. In the closed state of the fourth shift element B''', the first hollow gear shaft HR1 is connected to the second web shaft ST2 and the output shaft Ab in a rotationally fixed manner. In the closed state of the fifth shift element C''', the first hollow gear shaft HR1 is connected to the second sun shaft SO2 and the first web shaft ST1 in a rotationally fixed manner. During a power shift, only the first shift element D is closed. Compared to the embodiment according to FIG. 2a, the manual gearbox SG provides higher transmission ratios, so that further transmission ratio stages are not required. Otherwise, the exemplary embodiment according to FIG. 6 corresponds to the exemplary embodiment according to FIG. 2a, to which reference is made.

Figure 7:
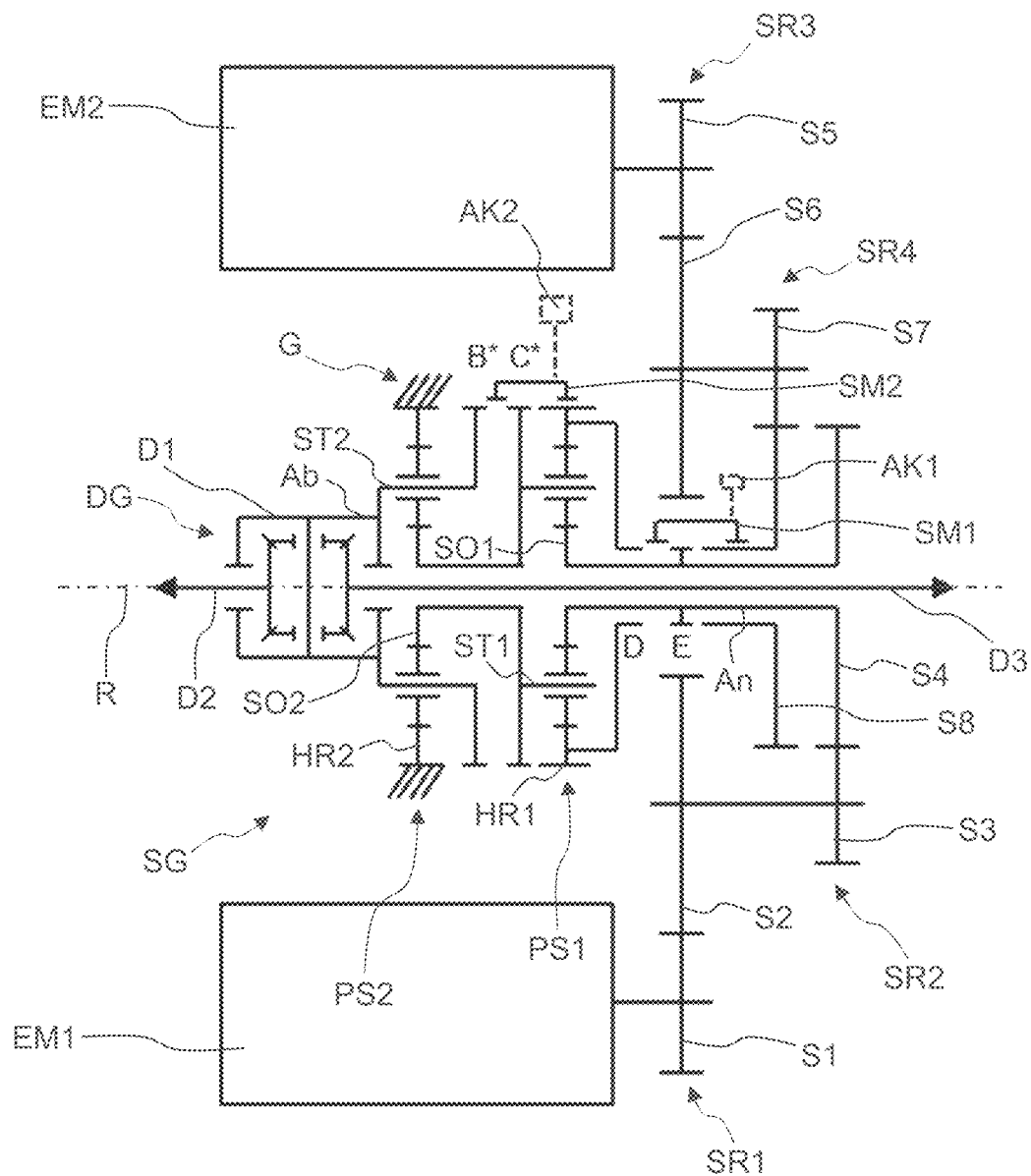
FIG. 7: a highly abstract schematic view of a drive unit according to the invention according to a sixth embodiment.

FIG. 7 shows a sixth embodiment of the drive unit according to the invention. The drive unit according to FIG. 7 is essentially the same as the drive unit according to FIG. 6, wherein the difference between these two embodiments lies in the design of the second shift unit. In the present case, the second shift unit has two shift elements B*, C*. When the third shift element B* is in the closed state, the output shaft Ab, the second web shaft ST2 and the first hollow gear shaft HR1 are connected in a rotationally fixed manner. Consequently, the third shift element B* in FIG. 7 corresponds to the fourth shift element B''' in FIG. 6. When the fourth shift element C* is in the closed state, the first hollow gear shaft HR1, the first web shaft ST1 and the second sun shaft SO2 are connected in a rotationally fixed manner. Consequently, the fourth shift element C* in FIG. 7 corresponds to the fifth shift element C''' in FIG. 6. The shift element A''' shown in FIG. 7 has been omitted. This embodiment is particularly suitable for vehicles with a lower vehicle weight. Otherwise, the exemplary embodiment according to FIG. 7 corresponds to the exemplary embodiment according to FIG. 6, to which reference is made.

Figure 8:
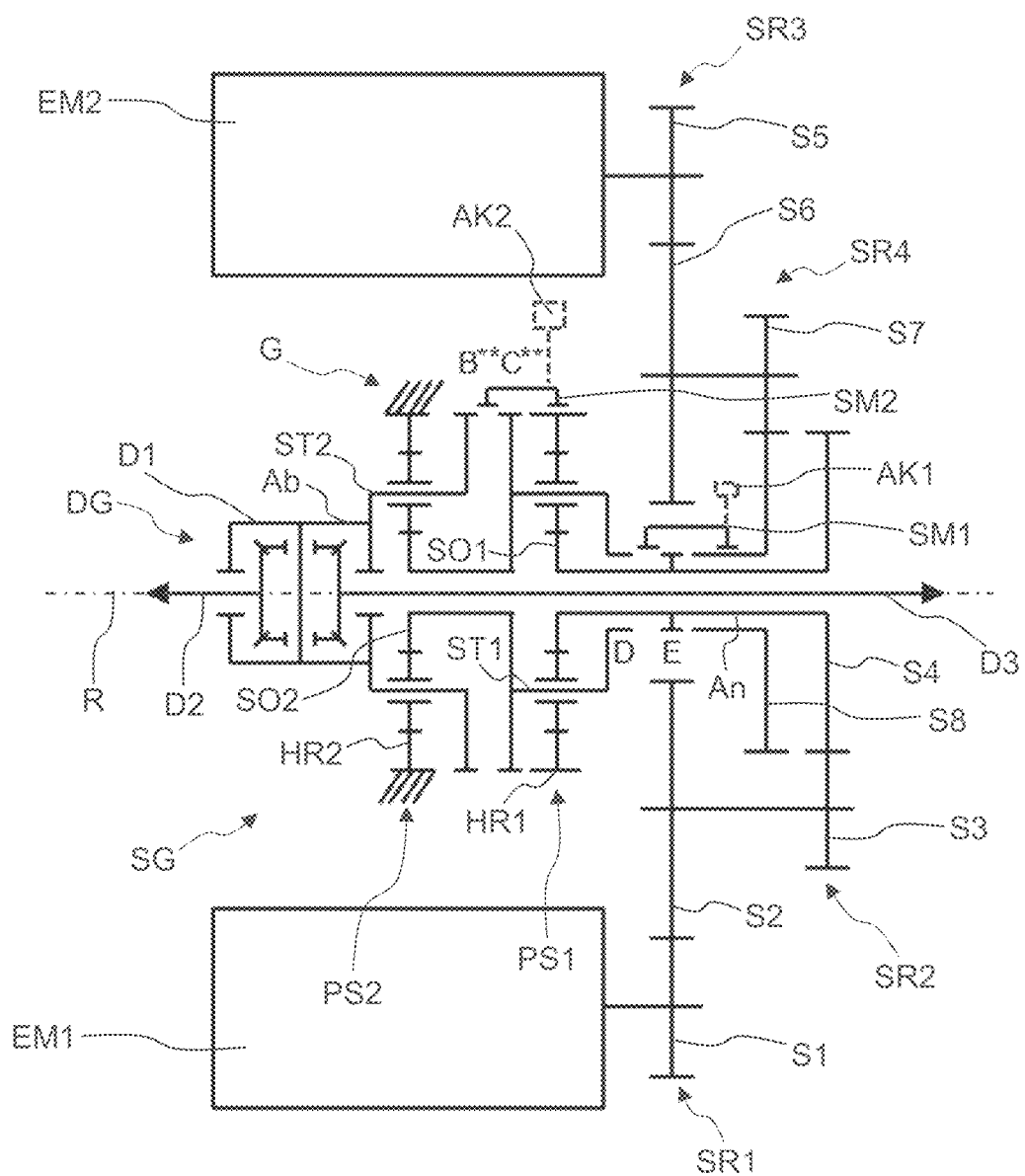
FIG. 8: a highly abstract schematic view of a drive unit according to the invention according to a seventh embodiment.

FIG. 8 shows a seventh embodiment of the drive unit according to the invention. The drive unit according to FIG. 8 is essentially the same as the drive unit according to FIG. 7, wherein the difference between these two embodiments lies in the design of the manual gearbox SG. The manual gearbox SG also has two planetary gear sets PS1, PS2 and a second shift unit with two shift elements B, C. The first sun shaft SO1 and the drive shaft An are connected in a rotationally fixed manner. The first web shaft ST1 and the second sun shaft SO2 are connected in a rotationally fixed manner, wherein the first web shaft ST1 and the second sun shaft SO2 are connected to the second electrical machine EM2 in the closed state of the first shift element D. The second web shaft ST2 and the output shaft Ab are connected in a rotationally fixed manner. The second hollow gear shaft HR2 is connected to a stationary component designed as housing G in a rotationally fixed manner. The first hollow gear shaft HR1 is connected in a rotationally fixed manner to the second web shaft ST2 and the output shaft Ab in the closed state of the third shift element B. In the closed state of the fourth shift element C, the first hollow gear shaft HR1 is connected to the second sun shaft SO2 and the first web shaft ST1 in a rotationally fixed manner. When the first shift element D is closed, the second electrical machine EM2 is connected to the output independently of the second shift unit and can thus support the tensile force (electromotive circuit), while the shift elements of the second shift unit can be switched without load, wherein the first electrical machine EM1 synchronizes the second shift unit. The third shift element B and the fourth shift element C are arranged together on one side of the first planetary gear set PS1. Otherwise, the exemplary embodiment according to FIG. 8 corresponds to the exemplary embodiment according to FIG. 7, to which reference is made.

Figure 9:
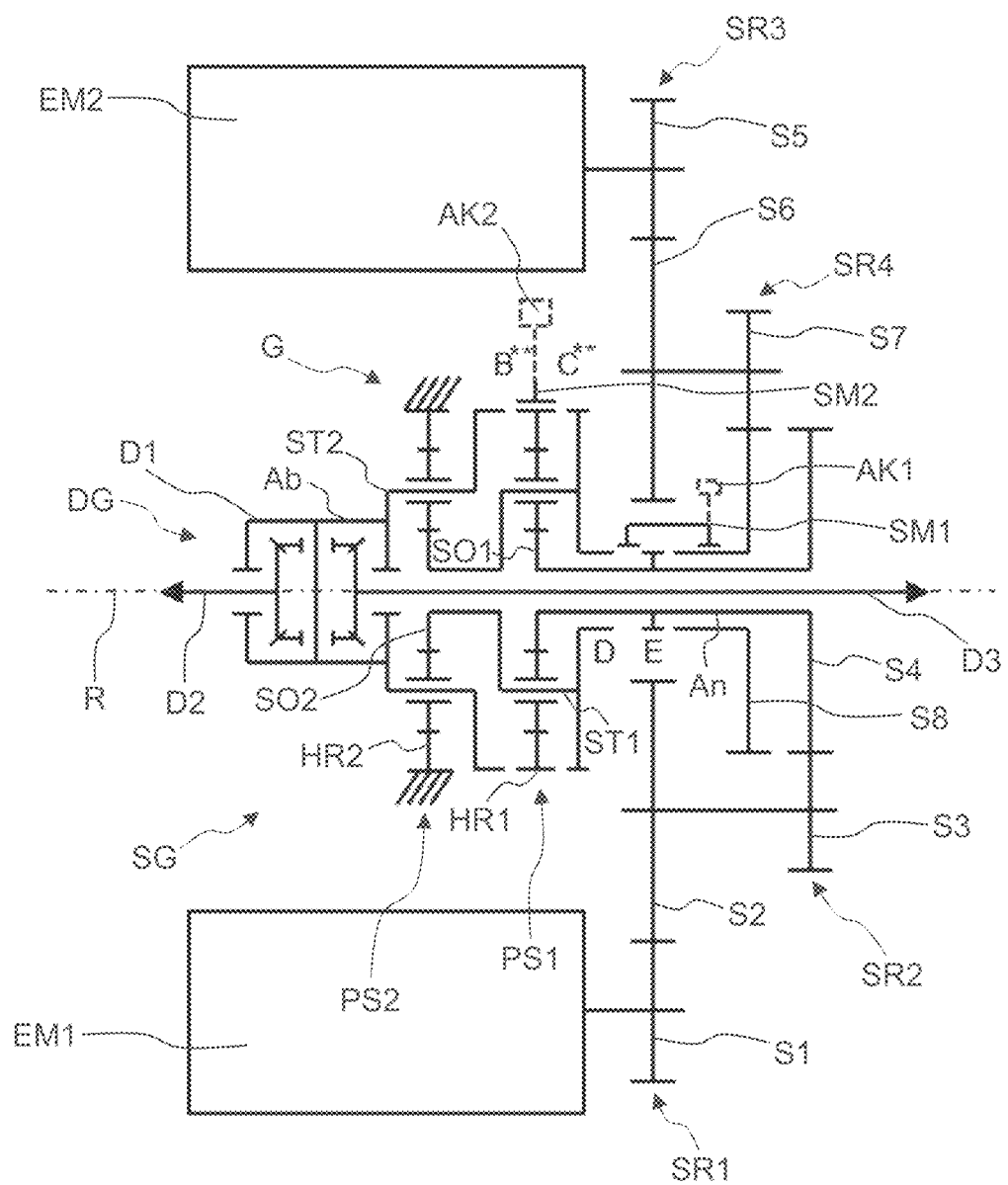
FIG. 9: a highly abstract schematic view of a drive unit according to the invention according to an eighth embodiment.

FIG. 9 shows an eighth embodiment of the drive unit according to the invention. The drive unit according to FIG. 9 is essentially the same as the drive unit according to FIG. 8, wherein the difference between these two embodiments lies in the arrangement of the second shift unit. The third shift element B is arranged on one side of the first planetary, gear set PS1 and the fourth shift element C is arranged on the opposite side of the first planetary gear set PS1. This can result in design advantages. Otherwise, the exemplary embodiment according to FIG. 9 corresponds to the exemplary embodiment according to FIG. 8, to which reference is made.

Figure 10:
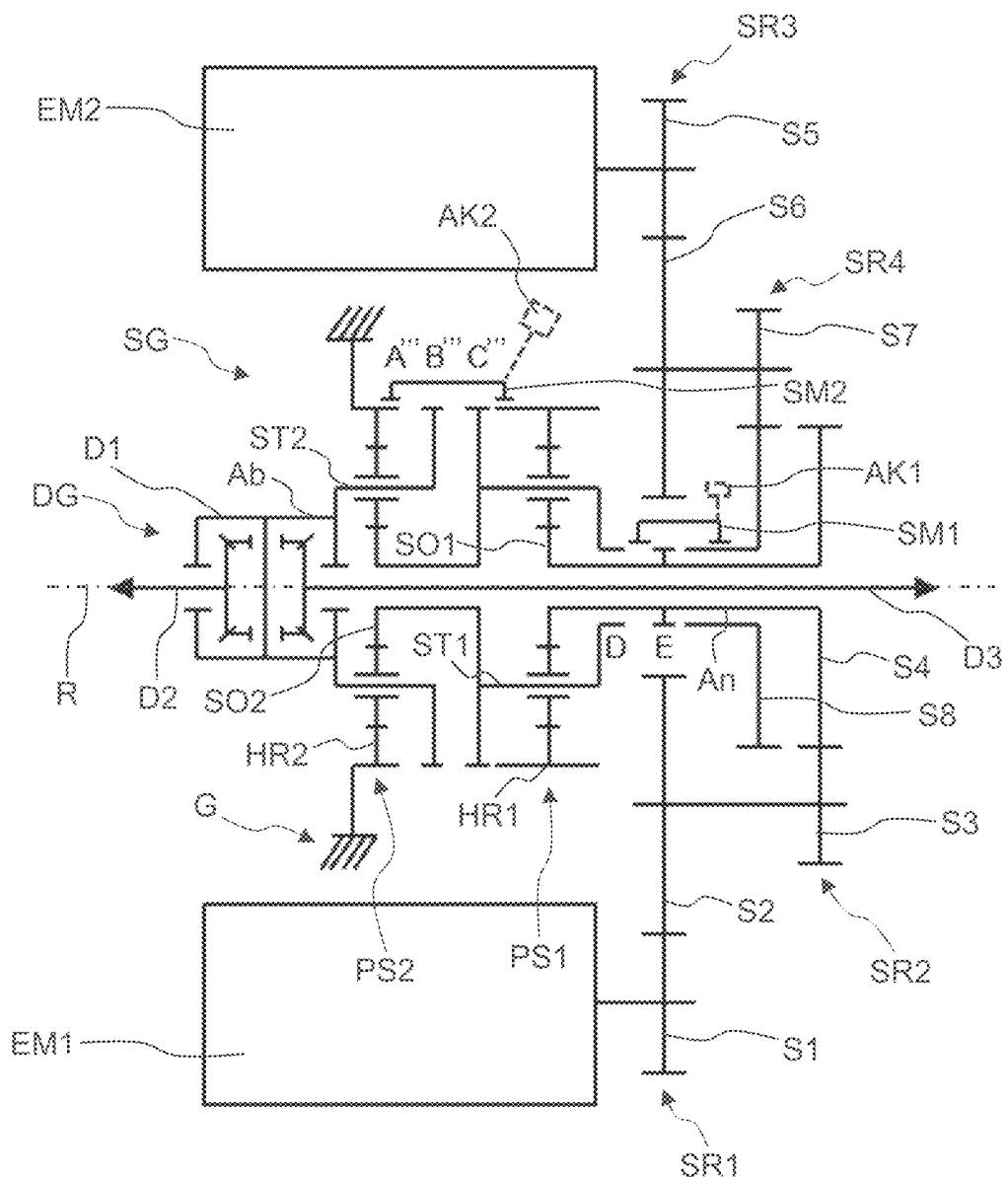
FIG. 10: a highly abstract schematic view of a drive unit according to the invention according to a ninth embodiment.

FIG. 10 shows a ninth embodiment of the drive unit according to the invention. The drive unit according to FIG.

10 is essentially the same as the drive unit according to FIG. 6, wherein the difference between these two embodiments lies in the design of the manual gearbox SG. In the present case, the first shift element D connects the eighth spur gear S8 with the first web shaft ST1 and the second sun shaft SO2 in the closed state. When the first shift element D is closed, the second electrical machine EM2 is connected to the output, independently of the shift elements A''', B''', C''' of the second shift unit is connected to the output drive and can thus support the tensile force, while the shift elements A''', B''', C''' of the second shift unit can be switched over without load, wherein the first electrical machine EM1 synchronizes them. Otherwise, the exemplary embodiment according to FIG. 10 corresponds to the exemplary embodiment according to FIG. 6, to which reference is made.

Figure 11:
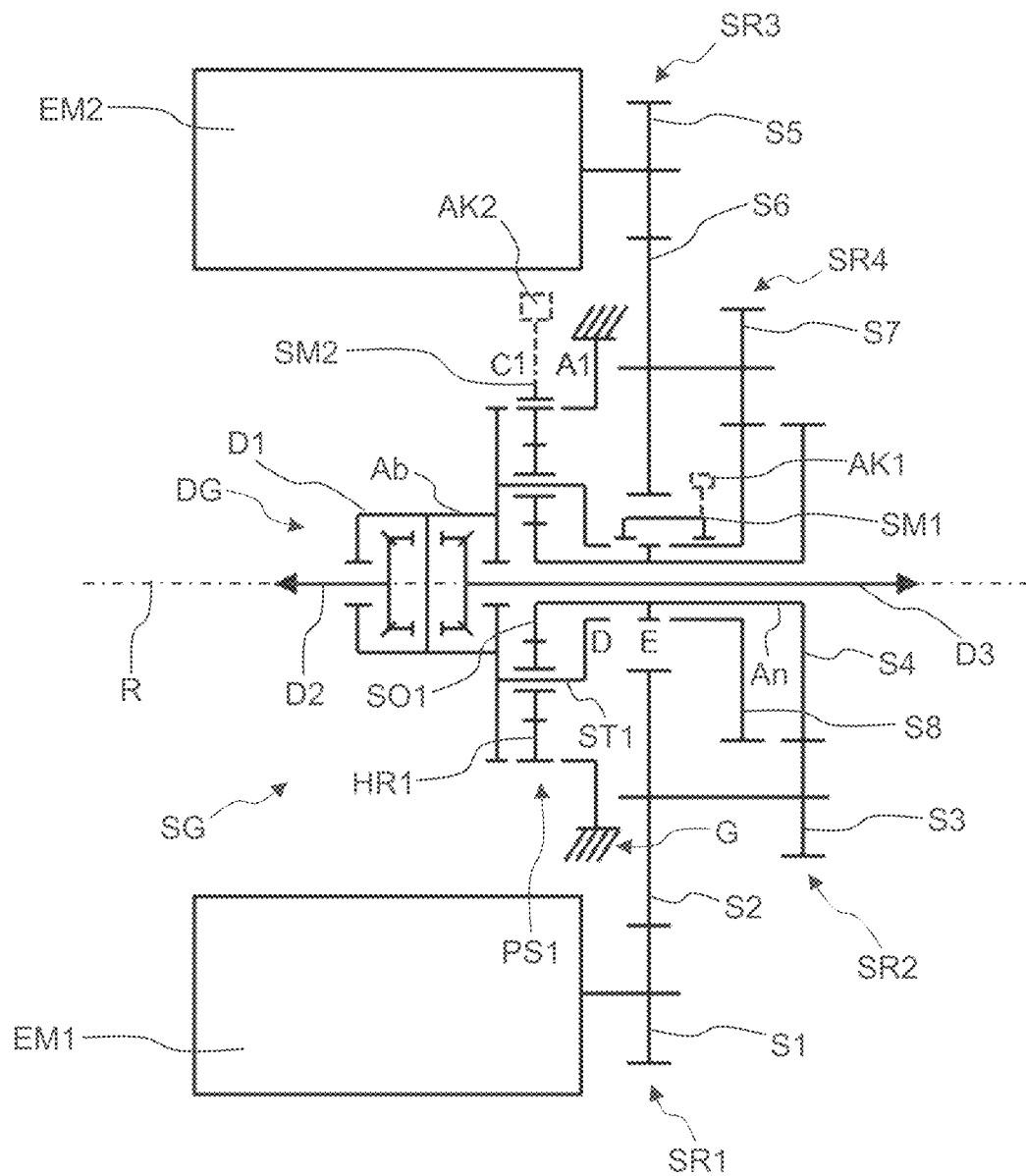
FIG. 11: a highly abstract schematic view of a drive unit according to the invention according to a tenth embodiment

FIG. 11 shows a tenth embodiment of the drive unit according to the invention. The drive unit according to FIG. 11 is essentially the same as the drive unit according to FIG. 2a, wherein the difference between these two embodiments lies in the design of the manual gearbox SG. In the present case, the manual gearbox SG has only a first planetary gear set PS1, a third shift element A1 and a fourth shift element C1. The third shift element A1 and the fourth shift element C1 are combined in a second shift unit. When the third shift element A1 is in a closed state, the first hollow gear shaft HR1 is connected in a rotationally fixed manner to a stationary component designed as a housing G. In the closed state of the fourth shift element C1, the first hollow gear shaft HR1 is connected in a rotationally fixed manner to the first web shaft ST1 and the output shaft Ab. Furthermore, in the closed state, the first shift element D connects the eighth spur gear S8 with the first web shaft ST1 and the output shaft Ab. When the first shift element D is closed, the second electrical machine EM2 is connected to the output drive independently of the first shift unit. Otherwise, the exemplary embodiment according to FIG. 11 corresponds to the exemplary embodiment according to FIG. 2a, to which reference is made.

Figure 12:
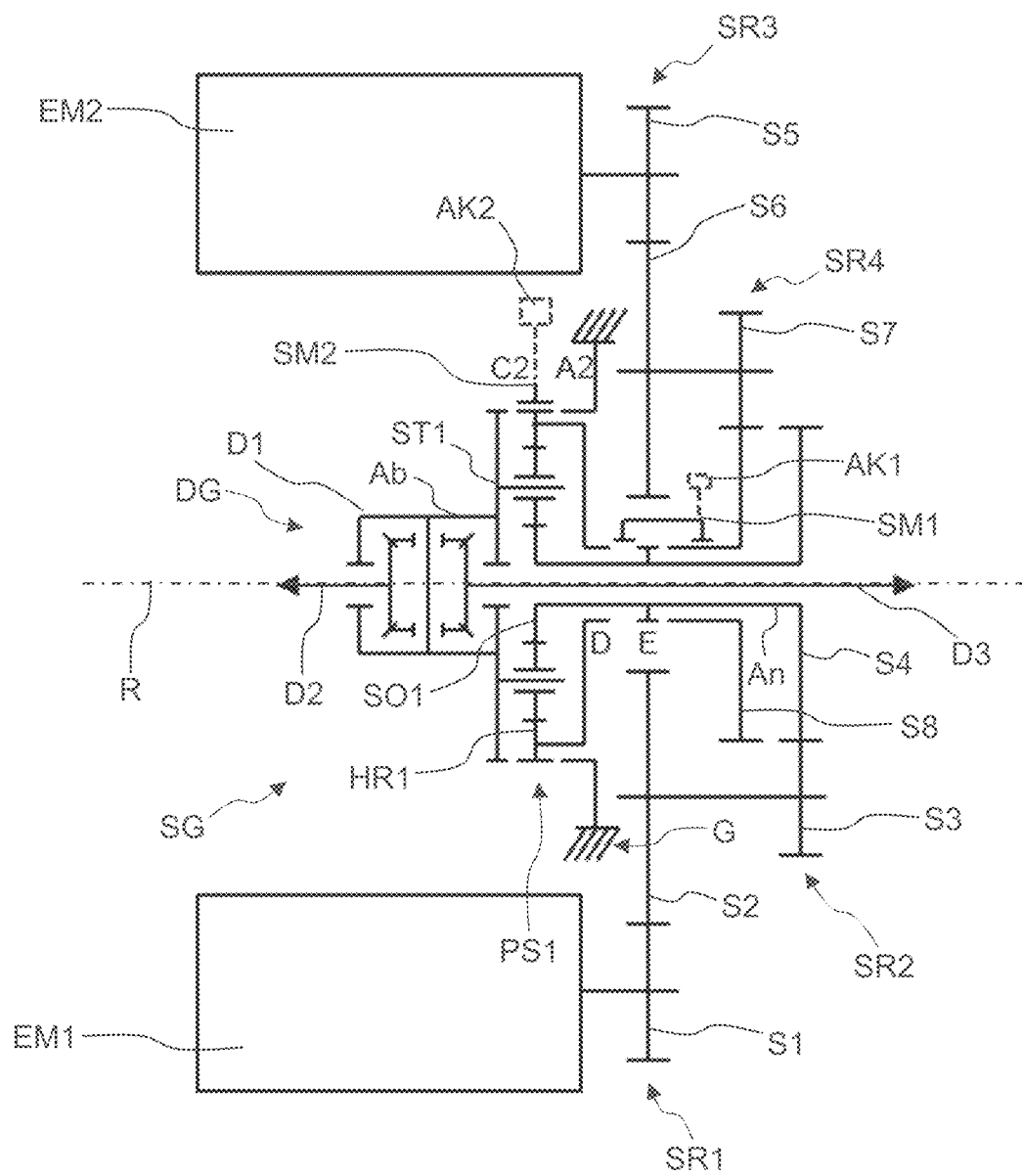
FIG. 12: a highly abstract schematic view of a drive unit according to the invention according to an eleventh embodiment.

FIG. 12 shows an eleventh embodiment of the drive unit according to the invention. The drive unit according to FIG. 12 is essentially the same as the drive unit according to FIG. 2a, wherein the difference between these two embodiments lies in the design of the manual gearbox SG. In the present case, the manual gearbox SG has only a first planetary gear set PS1, a third shift element A2 and a fourth shift element C2. The third shift element A2 and the fourth shift element C2 are combined in a second shift unit. When the third shift element A2 is in a closed state, the first hollow gear shaft HR1 is connected in a rotationally fixed manner to a stationary component designed as a housing G. In the closed state of the fourth shift element C2, the first hollow gear shaft HR1 is connected to the first web shaft ST1 and the output shaft Ab in a rotationally fixed manner. Furthermore, in the closed state, the first shift element D connects the eighth spur gear S8 to the first hollow gear shaft HR1. Otherwise, the exemplary embodiment according to FIG. 12 corresponds to the exemplary embodiment according to FIG. 2a, to which reference is made

REFERENCE NUMBERS

100 Vehicle
101 First axle
102 Second axle
R1 Vehicle wheel
R2 Vehicle wheel
R3 Vehicle wheel
R4 Vehicle wheel
An Drive shaft
Ab Output shaft
SG Manual gearbox
EM1 First electrical machine
EM2 Second electrical machine
ST1 First spur gear stage
ST2 Second spur gear stage
ST3 Third spur gear stage
ST4 Fourth spur gear stage
S1 First spur gear
S2 Second spur gear
S3 Third spur gear
S4 Fourth spur gear
S5 Fifth spur gear
S6 Sixth spur gear
S7 Seventh spur gear
S8 Eighth spur gear
PS1 First planetary gear set
SO1 First sun shaft
HO1 First hollow gear shaft
ST1 First web shaft
PS2 Second planetary gear set
SO2 Second sun shaft
HO2 Second hollow gear shaft
ST2 Second web shaft
AK1 First actuator
AK2 Second actuator
SM1 First sliding sleeve
SM2 Second sliding sleeve
G Housing
R Axis of rotation
KG Bevel gear stage
DG Differential
D1 Differential input shaft
D2 First differential output shaft
D3 Second differential output shaft
D First shift element
E Second shift element
A1, A2, B, A', B*, B**, A'', A''' third shift element
C1, C2, C, B', C*, C**, B'', B''' fourth shift element
C'', C''' fifth shift element

The invention claimed is:
1. A drive unit for a vehicle, comprising
a first electrical machine;
a second electrical machine arranged axially parallel to the first electrical machine;
a manual gearbox arranged axially parallel to the first and second electrical machines and having several gears and at least a first planetary gear set, which has a first sun shaft, a first hollow gear shaft, and a first web shaft;
a differential with one differential input shaft and two differential output shafts;
a drive shaft configured for connecting the first electrical machine to the manual gearbox;
an output shaft configured for connecting the manual gearbox to the differential;
a first positive-locking shift unit having a first shift element, a second shift element and a first sliding sleeve which is displaceable by means of a first actuator into a respective one of three shift positions;
wherein in a first shift position of the first sliding sleeve the first shift element is closed and the second electrical machine is connected to a shaft of the first planetary gear set with an actuating effect;

wherein, in a second shift position of the first sliding sleeve, both of the first and second shift elements are open and the second electrical machine is decoupled from the manual gearbox;

wherein in a third shift position of the first sliding sleeve, the second shift element is closed and the second electrical machine is connected to the drive shaft with an actuating effect;

wherein the first electrical machine is connected to the drive shaft via a first spur gear stage and a second spur gear stage;

wherein the second electrical machine can be connected to a shaft of the first planetary gear set or to the drive shaft via a third spur gear stage and a fourth spur gear stage; and wherein the first shift unit is arranged radially nested with the first spur gear stage and the third spur gear stage.

2. The drive unit according to claim 1, wherein:
the manual gearbox also has a third shift element and a fourth shift element;
the first sun shaft and the drive shaft are connected in a rotationally fixed manner;
the first web shaft and the output shaft are connected in a rotationally fixed manner and, in the closed state of the first shift element, are connected to the second electrical machine; and
the first hollow gear shaft is connected in a rotationally fixed manner to a stationary component when the third shift element is in the closed state and is connected to the output shaft and the first web shaft in a rotationally fixed manner when the fourth shift element is in the closed state.

3. The drive unit according to claim 2, wherein the third shift element and the fourth shift element are combined to form a second positive-locking shift unit with an axially displaceable second sliding sleeve, wherein the second sliding sleeve is displaceable by means of a second actuator into a respective one of three shift positions.

4. The drive unit according to claim 1, wherein:
the manual gearbox further comprises a third shift element and a fourth shift element;
the first sun shaft and the drive shaft are connected in a rotationally fixed manner;
the first web shaft and the output shaft are connected in a rotationally fixed manner; and
the first hollow gear shaft is connected to the second electrical machine in the closed state of the first shift element, in the closed state of the third shift element, is connected to a stationary component in a rotationally fixed manner, and in the closed state of the fourth shift element, is connected to the output shaft and the first web shaft in a rotationally fixed manner.

5. The drive unit according to claim 1, wherein:
the manual gearbox further comprises a second planetary gear set, a third shift element, and a fourth shift element;
the second planetary gear set has a second sun shaft, a second hollow gear shaft, and a second web shaft;
the first sun shaft, the second sun shaft, and the drive shaft are connected in a rotationally fixed manner;
the first web shaft and the second hollow gear shaft are connected in a rotationally fixed manner;
the second web shaft and the output shaft are connected in a rotationally fixed manner; and
the first hollow gear shaft is connected to the second electrical machine in the closed state of the first shift element, in the closed state of the third shift element, is connected to a stationary component in a rotationally fixed manner, and in the closed state of the fourth shift element, is connected to the second hollow gear shaft and the first web shaft in a rotationally fixed manner.

6. The drive unit according to claim 1, wherein:
the manual gearbox further comprises a second planetary gear set, a third shift element, and a fourth shift element;
the second planetary gear set has a second sun shaft, a second hollow gear shaft, and a second web shaft;
the first sun shaft, the second sun shaft and the drive shaft are connected in a rotationally fixed manner;
the first web shaft and the second hollow gear shaft are connected in a rotationally fixed manner and, in the closed state of the third shift element, the first web shaft and the second hollow gear shaft are connected to a stationary component in a rotationally fixed manner;
the second web shaft and the output shaft are connected in a rotationally fixed manner; and
the first hollow gear shaft is connected to the second electrical machine in the closed state of the first shift element and the first hollow gear shaft is connected to the stationary component in a rotationally fixed manner in the closed state of the fourth shift element.

7. The drive unit according to claim 1, wherein:
the manual gearbox further comprises a second planetary gear set, a third shift element, and a fourth shift element;
wherein the second planetary gear set has a second sun shaft, a second hollow gear shaft, and a second web shaft;
wherein the first sun shaft and the drive shaft are connected in a rotationally fixed manner;
wherein the first web shaft and the second sun shaft are connected in a rotationally fixed manner;
wherein the second web shaft and the output shaft are connected in a rotationally fixed manner;
wherein the second hollow gear shaft is connected to a stationary component in a rotationally fixed manner; and
wherein the first hollow gear shaft is connected to the second electrical machine in the closed state of the first shift element, in the closed state of the third shift element, the first hollow gear shaft is connected to the second web shaft and the output shaft in a rotationally fixed manner, and in the closed state of the fourth shift element, the first hollow gear shaft is connected to the second sun shaft and the first web shaft in a rotationally fixed manner.

8. The drive unit according to claim 1, wherein:
the manual gearbox further comprises a second planetary gear set, a third shift element, and a fourth shift element;
the second planetary gear set has a second sun shaft, a second hollow gear shaft, and a second web shaft;
the first sun shaft and the drive shaft are connected in a rotationally fixed manner;
the first web shaft and the second sun shaft are connected in a rotationally fixed manner and, in the closed state of the first shift element, the first web shaft and the second sun shaft are connected to the second electrical machine;
the second web shaft and the output shaft are connected in a rotationally fixed manner;
the second hollow gear shaft is connected to a stationary component in a rotationally fixed manner; and the first hollow gear shaft is connected in a rotationally fixed manner to the second web shaft and the output shaft in the closed state of the third shift element and is connected to the second sun shaft and the first web shaft in a rotationally fixed manner in the closed state of the fourth shift element.

9. The drive unit according to claim 1, wherein:
the manual gearbox further comprises a second planetary gear set, a third shift element, a fourth shift element, and a fifth shift element;
the second planetary gear set has a second sun shaft, a second hollow gear shaft, and a second web shaft;
the first sun shaft, the second sun shaft, and the drive shaft are connected in a rotationally fixed manner;
wherein the first web shaft and the second hollow gear shaft are connected in a rotationally fixed manner and, in the closed state of the third shift element, are connected to a stationary component in a rotationally fixed manner;
the second web shaft and the output shaft are connected in a rotationally fixed manner; and
the first hollow gear shaft is connected to the second electrical machine in the closed state of the first shift element, in the closed state of the fourth shift element the first hollow gear shaft is connected to the stationary component in a rotationally fixed manner and in the closed state of the fifth shift element the first hollow gear shaft is connected to the second hollow gear shaft and the first web shaft in a rotationally fixed manner.

10. The drive unit according to claim 9, wherein the third shift element, the fourth shift element, and the fifth shift element are combined to form a second positive-locking shift unit with an axially displaceable second sliding sleeve, wherein the second sliding sleeve is displaceable by means of a second actuator into a respective one of five shift positions.

11. The drive unit according to claim 1, wherein:
the manual gearbox further comprises a second planetary gear set, a third shift element, a fourth shift element, and a fifth shift element;
the second planetary gear set has a second sun shaft, a second hollow gear shaft, and a second web shaft;
wherein the first sun shaft and the drive shaft are connected in a rotationally fixed manner;
the first web shaft and the second sun shaft are connected in a rotationally fixed manner;
wherein the second web shaft and the output shaft are connected in a rotationally fixed manner;
the second hollow gear shaft is connected to a stationary component in a rotationally fixed manner; and
the first hollow gear shaft is connected to the second electrical machine in the closed state of the first shift element, the first hollow gear shaft is connected to the stationary component in a rotationally fixed manner in the closed state of the third shift element, in the closed state of the fourth shift element the first hollow gear shaft is connected to the second web shaft and the output shaft in a rotationally fixed manner, and in the closed state of the fifth shift element in the first hollow gear shaft is connected to the second sun shaft and the first web shaft in a rotationally fixed manner.

12. The drive unit according to claim 1, wherein:
the manual gearbox further comprises a second planetary gear set, a third shift element, a fourth shift element, and a fifth shift element;
the second planetary gear set has a second sun shaft, a second hollow gear shaft, and a second web shaft;
the first sun shaft and the drive shaft are connected in a rotationally fixed manner;
the first web shaft and the second sun shaft are connected in a rotationally fixed manner and, in the closed state of the first shift element, are connected to the second electrical machine;
the second web shaft and the output shaft connected in a rotationally fixed manner;
the second hollow gear shaft is connected to a stationary component in a rotationally fixed manner; and
the first hollow gear shaft is connected to the stationary component in a rotationally fixed manner in the closed state of the third shift element, in the closed state of the fourth shift element the first hollow gear shaft is connected in a rotationally fixed manner to the second web shaft and the output shaft, and in the closed state of the fifth shift element the first hollow gear shaft is connected in a rotationally fixed manner to the second sun shaft and the first web shaft.

13. The drive unit according to claim 1, wherein the differential is arranged coaxially with the manual gearbox and the third differential output shaft is guided axially through the manual gearbox, and wherein the differential input shaft is connected to the output shaft in a rotationally fixed manner.

14. The drive unit according to claim 1, wherein the differential is arranged transversely to the manual gearbox and the differential input shaft is connected to the output shaft via a bevel gear stage.

15. A vehicle comprising at least one drive unit according to claim 1.

* * * * *